(12) United States Patent
Kang

(10) Patent No.: US 12,395,578 B2
(45) Date of Patent: Aug. 19, 2025

(54) ELECTRONIC DEVICE COMPRISING HOUSING

(71) Applicant: Samsung Electronics Co., Ltd., Suwon-si (KR)

(72) Inventor: Yitae Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 18/169,526

(22) Filed: Feb. 15, 2023

(65) Prior Publication Data

US 2023/0199093 A1   Jun. 22, 2023

Related U.S. Application Data

(63) Continuation of application No. PCT/KR2021/015217, filed on Oct. 27, 2021.

(30) Foreign Application Priority Data

Nov. 11, 2020   (KR) .................. 10-2020-0150329

(51) Int. Cl.
    *H04M 1/02*   (2006.01)
(52) U.S. Cl.
    CPC ....... *H04M 1/0249* (2013.01); *H04M 1/0266* (2013.01); *H04M 1/0277* (2013.01)
(58) Field of Classification Search
    CPC . H04M 1/0249; H04M 1/0266; H04M 1/0277
    (Continued)

(56) References Cited

U.S. PATENT DOCUMENTS 7,874,534 B2   1/2011   Kobayashi
8,436,256 B2   5/2013   Kim et al.
(Continued)

FOREIGN PATENT DOCUMENTS

JP   2004-095976 A   3/2004
JP   2008-103505 A   5/2008
(Continued)

OTHER PUBLICATIONS

International Search Report dated Feb. 25, 2022, issued in International Application No. PCT/KR2021/015217.
(Continued)

*Primary Examiner* — April G Gonzales
(74) *Attorney, Agent, or Firm* — Jefferson IP Law, LLP

(57) ABSTRACT

An electronic device is provided. The electronic device includes a display, a first plate, a side member disposed between the display and the first plate, a support member disposed inside the side member, a printed circuit board disposed between the support member and the first plate, and a second plate disposed between the first plate and the printed circuit board. The second plate includes a stacked structure including a first layer, formed at an edge portion of the second plate and extending from the second plate, and a second layer disposed on the first layer. A first protrusion portion of a first stacked structure may be at least partially inserted into a first opening of the support member, and a second protrusion portion of a second stacked structure may be at least partially inserted into a first locking groove of the support member.

20 Claims, 24 Drawing Sheets

(58) Field of Classification Search
USPC .......................................................... 455/566
See application file for complete search history.

(56) References Cited

U.S. PATENT DOCUMENTS

| | | | |
|---|---|---|---|
| 9,609,099 B2 | 3/2017 | Lee et al. | |
| 9,921,367 B2 | 3/2018 | Jung | |
| 10,034,365 B2 | 7/2018 | Yang | |
| 10,534,405 B2* | 1/2020 | Kim | H05K 1/144 |
| 10,716,223 B2* | 7/2020 | Fordham | H05K 5/03 |
| 10,971,809 B2* | 4/2021 | Shin | H05K 1/147 |
| 11,050,136 B2* | 6/2021 | Jung | H04M 1/02 |
| 11,245,207 B2* | 2/2022 | Park | H01R 12/52 |
| 11,246,229 B2 | 2/2022 | Lee et al. | |
| 11,984,667 B2 | 5/2024 | Kim et al. | |
| 12,081,246 B2* | 9/2024 | Kim | H04B 1/40 |
| 2004/0244884 A1* | 12/2004 | Hideshima | C22C 38/04 148/610 |
| 2009/0165905 A1* | 7/2009 | Hideshima | C21D 8/0468 148/621 |
| 2017/0171960 A1* | 6/2017 | Yang | H05K 1/0216 |
| 2018/0299929 A1* | 10/2018 | Kim | G06F 1/1635 |
| 2018/0302994 A1* | 10/2018 | Fordham | G06F 1/1637 |
| 2020/0028241 A1* | 1/2020 | Jung | H01Q 1/44 |
| 2020/0225295 A1* | 7/2020 | Hyun | G06F 1/1656 |
| 2021/0288401 A1* | 9/2021 | Lee | H01Q 1/243 |

FOREIGN PATENT DOCUMENTS

| | | | |
|---|---|---|---|
| JP | 2008-300635 | A | 12/2008 |
| KR | 10-2004-0104939 | A | 12/2004 |
| KR | 10-0892531 | B1 | 4/2009 |
| KR | 10-2011-0045153 | A | 5/2011 |
| KR | 10-2012-0051169 | A | 5/2012 |
| KR | 10-2012-0115019 | A | 10/2012 |
| KR | 10-2014-0074652 | A | 6/2014 |
| KR | 10-2016-0016153 | A | 2/2016 |
| KR | 10-1633583 | B1 | 6/2016 |
| KR | 10-2017-0016649 | A | 2/2017 |
| KR | 10-2018-0031120 | A | 3/2018 |
| KR | 10-2019-0020971 | A | 3/2019 |
| KR | 10-2020-0015176 | A | 2/2020 |
| KR | 10-2020-0046246 | A | 5/2020 |
| KR | 10-2020-0093736 | A | 8/2020 |
| KR | 10-2020-0101018 | A | 8/2020 |
| KR | 10-2020-0101178 | A | 8/2020 |
| KR | 10-2020-0101218 | A | 8/2020 |

OTHER PUBLICATIONS

Korean Notice of Allowance dated Dec. 2, 2024, issued in Korean Patent Application No. 10-2020-0150329.

* cited by examiner

ELECTRONIC DEVICE COMPRISING HOUSING

CROSS-REFERENCE TO RELATED APPLICATION(S)

This application is a continuation application, claiming priority under § 365(c), of an International application No. PCT/KR2021/015217, filed on Oct. 27, 2021, which is based on and claims the benefit of a Korean patent application number 10-2020-0150329, filed on Nov. 11, 2020, in the Korean Intellectual Property Office, the disclosure of which is incorporated by reference herein in its entirety.

BACKGROUND

1. Field

The disclosure relates to an electronic device including a housing.

2. Description of Related Art

An electronic device may include a printed circuit board having various parts disposed thereon and a plate covering at least a portion of the printed circuit board.

The plate may protect the printed circuit board from an external impact and may dissipate heat generated from other parts of the electronic device. Due to this, the plate may be required to be designed based on thermal conductivity for heat dissipation inside the electronic device as well as mechanical properties (e.g., stiffness) for protection of the printed circuit board.

Furthermore, other parts, for example, an antenna that supports magnetic secure transmission (MST) and near field communication (NFC) may be disposed on the plate, and thus the mountability of the electronic device may be improved.

The above information is presented as background information only to assist with an understanding of the disclosure. No determination has been made, and no assertion is made, as to whether any of the above might be applicable as prior art with regard to the disclosure.

SUMMARY

The plate may be fixed to the printed circuit board through a screw. However, there is no means for fixing the position of the plate on the printed circuit board before fastening the screw, and therefore movement of the plate may cause the screw to be loosely tightened or fastened at an inclined angle. In the case in which the screw is loosely tightened or fastened at an inclined angle, the plate may be lifted from the top of the printed circuit board. In this case, the plate cannot perform a function of protecting the printed circuit board, and a connector coupled with the printed circuit board may be pulled out. This is because the plate covers the connector coupled to the printed circuit board to prevent separation of the connector. In addition, an antenna disposed on the plate may be misaligned, and therefore the performance of the antenna may be degraded.

Meanwhile, in a case in which the stiffness of the plate is insufficient, deformation, such as bending of the plate may occur. For example, a screw fastening portion of the plate subjected to a relatively large load may be vulnerable to deformation. To prevent this problem, an intermediate member, such as a washer, may be separately disposed between the screw head and the plate. Since the intermediate member is disposed in a form welded to the plate, it may cause an increase in process cost as well as material cost of the electronic device.

Aspects of the disclosure are to address at least the above-mentioned problems and/or disadvantages and to provide at least the advantages described below. Accordingly, an aspect of the disclosure is to provide an electronic device including a housing.

Additional aspects will be set forth in part in the description which follows and, in part, will be apparent from the description, or may be learned by practice of the presented embodiments.

In accordance with an aspect of the disclosure, an electronic device is provided. The electronic device includes a display that forms at least a portion of a front surface of the electronic device, a first plate that forms at least a portion of a rear surface of the electronic device, a side member that is disposed between the display and the first plate and that forms at least a portion of a side surface of the electronic device, a support member that is disposed inside the side member and that has a first opening and a first stopping recess formed therein, a printed circuit board disposed between the support member and the first plate, and a second plate that is disposed between the first plate and the printed circuit board and coupled with the support member and that covers at least a portion of the printed circuit board. The second plate includes a stacked structure that is formed on a periphery of the second plate and that includes a first layer that extends from the second plate and a second layer disposed on the first layer. The stacked structure includes a first stacked structure including a first protrusion that extends toward the display and a second stacked structure including a second protrusion that extends toward the side member. The first protrusion is at least partially inserted into the first opening of the support member, and the second protrusion is at least partially inserted into the first stopping recess of the support member.

In accordance with another aspect of the disclosure, an electronic device is provided. The electronic device includes a display that forms at least a portion of a front surface of the electronic device, a first plate that forms at least a portion of a rear surface of the electronic device, a side member that is disposed between the display and the first plate and that forms at least a portion of a side surface of the electronic device, a support member that is disposed inside the side member and that has a first opening and a first stopping recess formed therein, a first printed circuit board disposed between the support member and the first plate, at least one connector disposed on the first printed circuit board, and a second plate that is disposed between the first plate and the first printed circuit board and coupled with the support member and that covers at least a portion of the first printed circuit board. The second plate includes a stacked structure that is formed on a periphery of the second plate and that includes a first layer that extends from the second plate and a second layer disposed on the first layer. The stacked structure includes a first stacked structure including a first protrusion that extends toward the display, a second stacked structure including a second protrusion that extends toward the side member, and a third stacked structure that at least partially overlaps the at least one connector. The first protrusion is at least partially inserted into the first opening of the support member to restrict movement of the second plate in a horizontal direction, and the second protrusion is at least partially inserted into the first stopping recess of the support member to restrict movement of the second plate in a vertical direction.

According to the embodiments of the disclosure, the durability of the plate may be improved by increasing the stiffness of the plate using the stacked structure.

According to the embodiments of the disclosure, damage to the printed circuit board and/or separation of the connector connected to the printed circuit board may be prevented by preventing deformation of the plate using the stacked structure.

According to the embodiments of the disclosure, the assembly performance of the plate may be improved by preventing movement of the plate through the protrusion of the stacked structure coupled with the support member.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
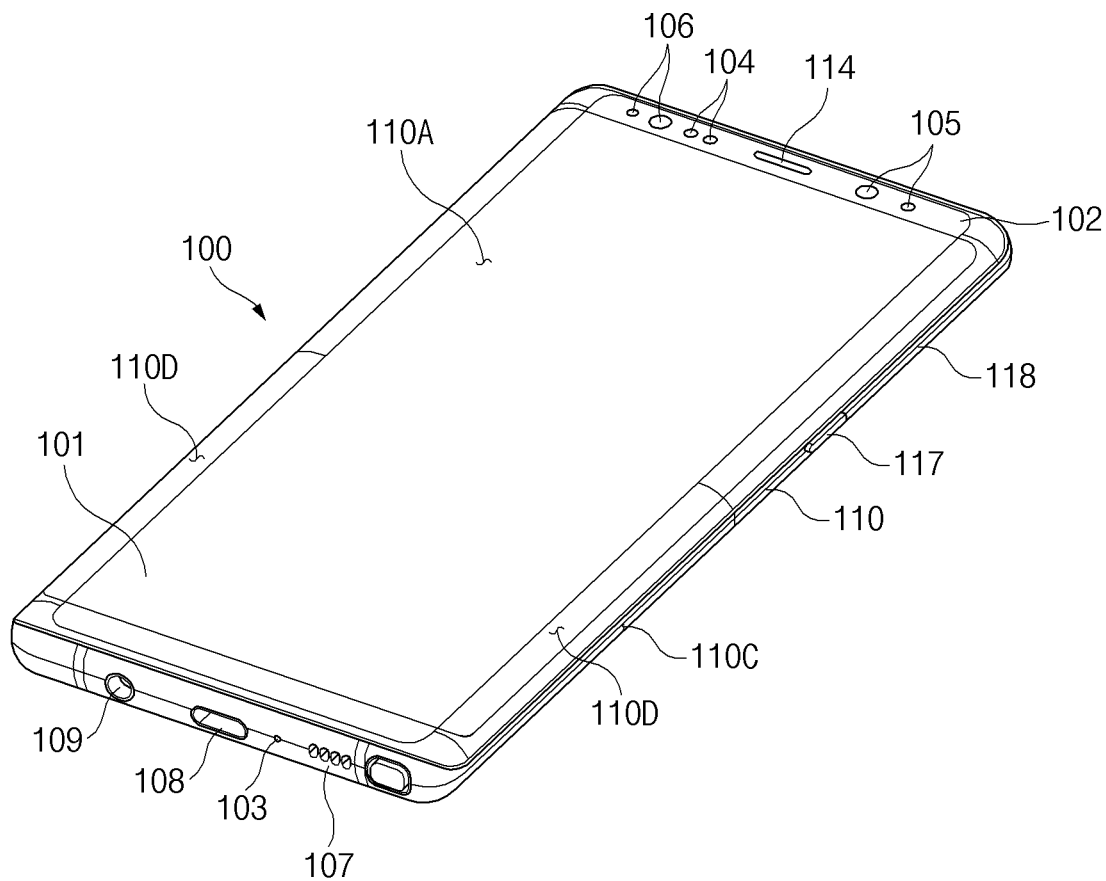
FIG. 1 is a perspective view of an electronic device as viewed in one direction according to an embodiment of the disclosure.

FIG. 1 is a perspective view of an electronic device as viewed in one direction according to an embodiment of the disclosure.

Figure 2:
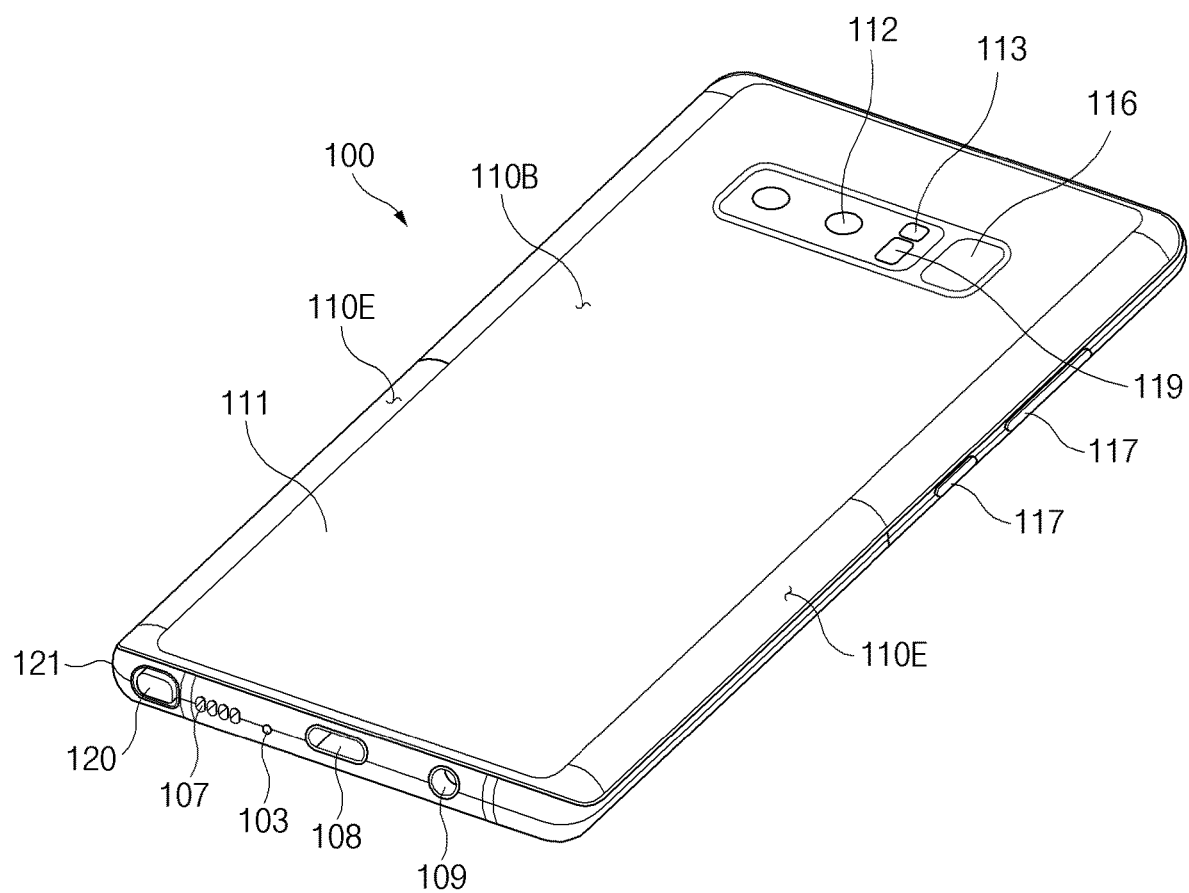
FIG. 2 is a perspective view of an electronic device as viewed in another direction according to an embodiment of the disclosure.

FIG. 2 is a perspective view of an electronic device as viewed in another direction according to an embodiment of the disclosure.

Referring to FIGS. 1 and 2, the electronic device 100 according to an embodiment (e.g., an electronic device 1301 of FIG. 13) may include a housing 110 that includes a first surface (or, a front surface) 110A, a second surface (or, a rear surface) 110B, and a side surface 110C surrounding a space between the first surface 110A and the second surface 110B. In another embodiment (not illustrated), the housing may refer to a structure that forms some of the first surface 110A, the second surface 110B, and the side surface 110C of FIG.

1. According to an embodiment, the first surface 110A may be formed by a front plate 102, at least a portion of which is substantially transparent (e.g., a glass plate including various coating layers, or a polymer plate). The second surface 110B may be formed by a back plate 111 that is substantially opaque. The back plate 111 may be formed of, for example, coated or colored glass, ceramic, a polymer, metal (e.g., aluminum, stainless steel (STS), or magnesium), or a combination of at least two of the aforementioned materials. The side surface 110C may be formed by a side bezel structure (or, a "side member") 118 that is coupled with the front plate 102 and the back plate 111 and that includes metal and/or a polymer. In some embodiments, the back plate 111 and the side bezel structure 118 may be integrally formed with each other and may include the same material (e.g., a metallic material, such as aluminum).

In the illustrated embodiment, the front plate 102 may include, at opposite long edges thereof, two first regions 110D that curvedly and seamlessly extend from the first surface 110A toward the back plate 111. In the illustrated embodiment (refer to FIG. 2), the back plate 111 may include, at opposite long edges thereof, two second regions 110E that curvedly and seamlessly extend from the second surface 110B toward the front plate 102. In some embodiments, the front plate 102 (or, the back plate 111) may include only one of the first regions 110D (or, the second regions 110E). In another embodiment, a part of the first regions 110D or the second regions 110E may not be included. In the embodiments, when viewed from a side of the electronic device 100, the side bezel structure 118 may have a first thickness (or, width) at sides not including the first regions 110D or the second regions 110E and may have a second thickness at sides including the first regions 110D or the second regions 110E, the second thickness being smaller than the first thickness.

According to an embodiment, the electronic device 100 may include at least one of a display 101, audio modules 103, 107, and 114, sensor modules 104, 116, and 119, camera modules 105, 112, and 113, key input devices 117, a light emitting element 106, a pen input device 120, or connector holes 108 and 109. In some embodiments, the electronic device 100 may omit at least one component (e.g., the key input devices 117 or the light emitting element 106) among the aforementioned components, or may additionally include other component(s).

The display 101, for example, may be exposed through most of the front plate 102. In some embodiments, at least a portion of the display 101 may be exposed through the front plate 102 that forms the first surface 110A and the first regions 110D of the side surface 110C. In some embodiments, the periphery of the display 101 may be formed to be substantially the same as the shape of the adjacent outside edge of the front plate 102. In another embodiment (not illustrated), to expand the area by which the display 101 is exposed, the gap between the periphery of the display 101 and the periphery of the front plate 102 may be formed to be substantially constant.

In another embodiment (not illustrated), a recess or opening may be formed in a portion of a screen display region of the display 101, and the electronic device 100 may include at least one of the audio module 114, the sensor module 104, the camera module 105, or the light emitting element 106 that is aligned with the recess or the opening. In another embodiment (not illustrated), the electronic device 100 may include, on a rear surface of the screen display region of the display 101, at least one of the audio module 114, the sensor module 104, the camera module 105, the fingerprint sensor 116, or the light emitting element 106. In another embodiment (not illustrated), the display 101 may be combined with, or disposed adjacent to, touch detection circuitry, a pressure sensor capable of measuring the intensity (pressure) of a touch, and/or a digitizer for detecting a stylus pen of a magnetic field type. In some embodiments, at least a part of the sensor modules 104 and 119 and/or at least a part of the key input devices 117 may be disposed in the first regions 110D and/or the second regions 110E.

The audio modules 103, 107, and 114 may include the microphone hole 103 and the speaker holes 107 and 114. A microphone for obtaining external sound may be disposed in the microphone hole 103, and in some embodiments, a plurality of microphones may be disposed in the microphone hole 103 to detect the direction of sound. The speaker holes 107 and 114 may include the external speaker hole 107 and the receiver hole 114 for telephone call. In some embodiments, the speaker holes 107 and 114 and the microphone hole 103 may be implemented as a single hole, or without the speaker holes 107 and 114, a speaker may be included (e.g., a piezoelectric speaker).

The sensor modules 104, 116, and 119 may generate an electrical signal or a data value that corresponds to an operational state inside the electronic device 100 or an environmental state external to the electronic device 100. The sensor modules 104, 116, and 119 may include, for example, the first sensor module 104 (e.g., a proximity sensor) and/or the second sensor module (not illustrated) (e.g., a fingerprint sensor) that is disposed on the first surface 110A of the housing 110, and/or the third sensor module 119 (e.g., an HRM sensor) and/or the fourth sensor module 116 (e.g., a fingerprint sensor) that is disposed on the second surface 110B of the housing 110. The fingerprint sensor may be disposed not only on the first surface 110A of the housing 110 (e.g., the display 101) but also on the second surface 110B. The electronic device 100 may further include a non-illustrated sensor module, for example, at least one of a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor 104.

The camera modules 105, 112, and 113 may include the first camera device 105 disposed on the first surface 110A of the electronic device 100, and the second camera device 112 and/or the flash 113 disposed on the second surface 110B. The camera devices 105 and 112 may include one or more lenses, an image sensor, and/or an image signal processor. The flash 113 may include, for example, a light emitting diode or a xenon lamp. In some embodiments, two or more lenses (an IR camera lens, a wide angle lens, and a telephoto lens) and image sensors may be disposed on one surface of the electronic device 100.

The key input devices 117 may be disposed on the side surface 110C of the housing 110. In another embodiment, the electronic device 100 may not include all or some of the aforementioned key input devices 117, and the key input devices 117 not included may be implemented in a different form, such as a soft key, on the display 101. In some embodiments, the key input devices may include the sensor module 116 disposed on the second surface 110B of the housing 110.

The light emitting element 106, for example, may be disposed on the first surface 110A of the housing 110. The light emitting element 106, for example, may provide state information of the electronic device 100 in the form of light. In another embodiment, the light emitting element 106 may provide, for example, a light source that operates in conjunction with operation of the camera module 105. The light emitting element 106 may include, for example, an LED, an IR LED, and a xenon lamp.

The connector holes 108 and 109 may include the first connector hole 108 capable of accommodating a connector (e.g., a USB connector) for transmitting and receiving power and/or data with an external electronic device, and/or the second connector hole (e.g., an earphone jack) 109 capable of accommodating a connector for transmitting and receiving audio signals with an external electronic device.

The pen input device 120 (e.g., a stylus pen) may be inserted into, or detached from, the housing 110 through a hole 121 formed in a side surface of the housing 110 and may include a button for facilitating the detachment. The pen input device 120 may have a separate resonance circuit embedded therein and may operate in conjunction with an electro-magnetic induction panel (e.g., a digitizer) included in the electronic device 100. The pen input device 120 may include an electro-magnetic resonance (EMR) type, an active electrical stylus (AES) type, and an electric coupled resonance (ECR) type.

Figure 3:
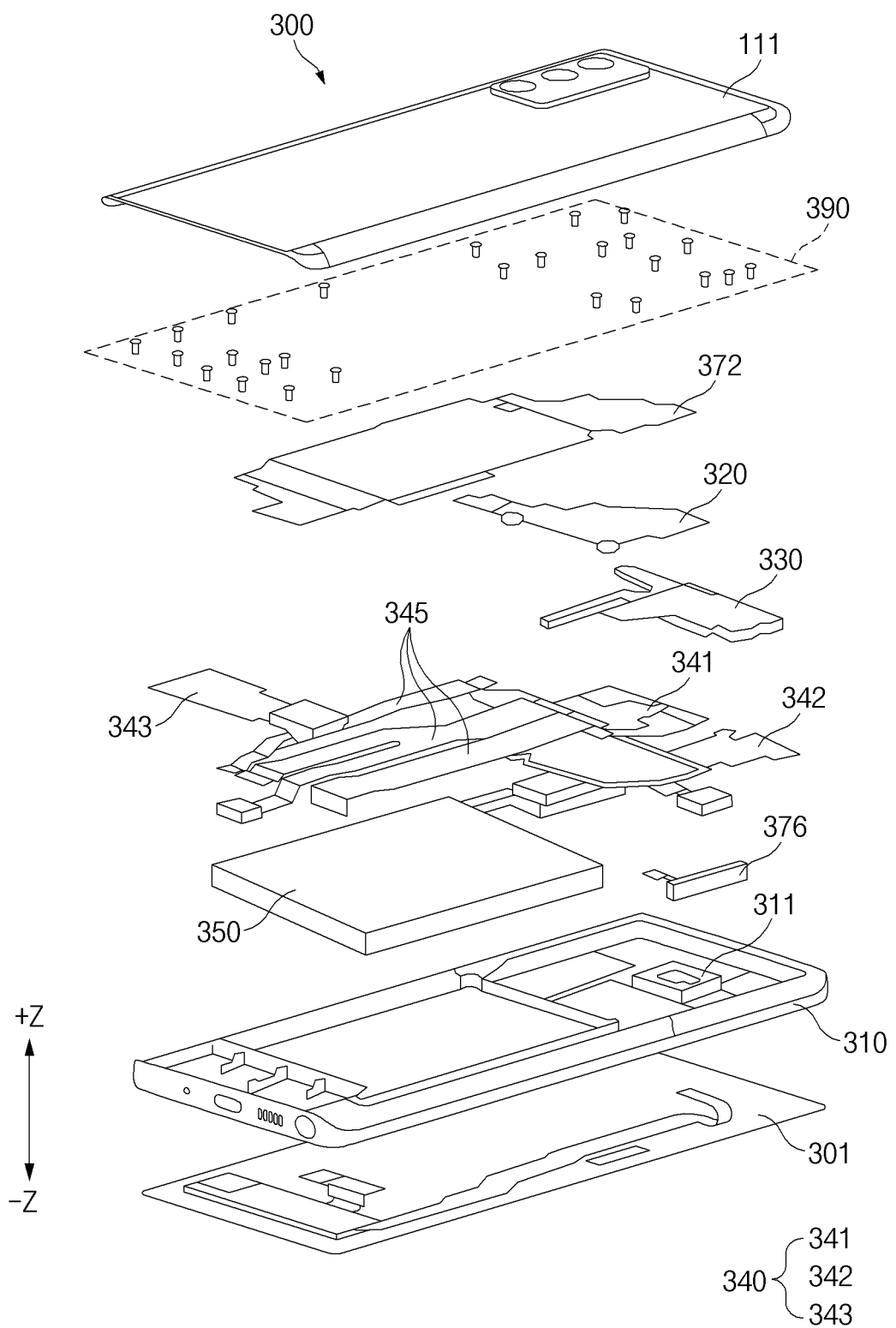
FIG. 3 is an exploded perspective view of an electronic device according to an embodiment of the disclosure.

FIG. 3 is an exploded perspective view of an electronic device according to an embodiment of the disclosure.

Referring to FIG. 3, the electronic device 300 according to an embodiment (e.g., the electronic device 100 of FIGS. 1 and 2) may include a back plate 111 (or, a first plate 111), a second plate 320, a third plate 330, at least one printed circuit board 340, screws 390, a first antenna 372, a plurality of flexible printed circuit boards 345, a battery 350, a second antenna 376, a side member 310 (e.g., the side bezel structure 118 of FIG. 1), a support member 311 (e.g., a bracket), a display panel 301, and a front plate 111.

At least one of the components of the electronic device 300 may be identical or similar to at least one of the components of the electronic device 100 of FIG. 1 or FIG. 2, and repetitive descriptions will hereinafter be omitted.

In an embodiment, the second plate 320 may be disposed between the first plate 111 and the at least one printed circuit board 340. For example, the second plate 320 may be disposed between the first plate 111 and a first printed circuit board 341.

In an embodiment, the first printed circuit board 341, a second printed circuit board 342, and a third printed circuit board 343 may be disposed between the first plate 111 and the support member 311. In an embodiment, the first printed circuit board 341, the second printed circuit board, and the third printed circuit board 343 may be electrically connected with one another. For example, the first printed circuit board 341 may be electrically connected with the second printed circuit board 342 and the third printed circuit board 343. For example, the first printed circuit board 341 and the third printed circuit board 343 may be connected through at least one of the plurality of flexible printed circuit boards 345. The first printed circuit board 341 and the second printed circuit board 342 may be electrically connected through a non-illustrated connecting member. For example, a structure formed to be coupled with the first printed circuit board 341 may be disposed on the second printed circuit board 342, and by stacking the first printed circuit board 341 on the second printed circuit board 342, the first printed circuit board 341 and the second printed circuit board 342 may be connected with each other through the structure. However, a method for electrically connecting the first printed circuit board 341, the second printed circuit board 342, and the third printed circuit board 343 is not limited by the above example, and various methods available to those skilled in the art may be applied.

In an embodiment, various parts of the electronic device 300 may be disposed on the first printed circuit board 341 and/or the second printed circuit board 342. For example, the first printed circuit board 341 and/or the second printed circuit board 342 may have a processor (e.g., 1320 of FIG. 13) and/or a memory (e.g., 1330 of FIG. 13) disposed thereon, but is not limited by the above example. For example, at least one of components of the electronic device 1301 of FIG. 13 may be disposed on the first printed circuit board 341 and/or the second printed circuit board 342.

In another embodiment, at least two of the first printed circuit board 341, the second printed circuit board 342, and/or the third printed circuit board 343 may be integrally formed, or one of the first printed circuit board 341, the second printed circuit board 342, and/or the third printed circuit board 343 may be omitted. For example, the first printed circuit board 341 and the second printed circuit board 342 may be integrally formed with each other.

In an embodiment, the first antenna 372 may be disposed between the first plate 111 and the second plate 320. In an embodiment, the first antenna 372 may be attached to the second plate 320. In an embodiment, the first antenna 372 may include, for example, a near field communication (NFC) antenna, a wireless charging antenna, and/or a magnetic secure transmission (MST) antenna. For example, the first antenna 372 may include a loop antenna formed of a conductive coil to support short-range wireless communication and/or wireless power transmission/reception with an external device.

In an embodiment, the third plate 330 may be disposed between the first plate 111 and the second printed circuit board 342. In an embodiment, the third plate 330 may include an antenna radiator, such as a conductive pattern. In another embodiment, an antenna structure may be formed by a portion of the side member 310 together with the antenna radiator of the third plate 330.

In an embodiment, the second antenna 376 may be disposed adjacent to the side member 310. In an embodiment, the second antenna 376 may include an array antenna including a plurality of antenna elements. In an embodiment, the second antenna 376 may be electrically connected with the first printed circuit board. In an embodiment, the second antenna 376 may support fifth-generation (5G) communication.

In an embodiment, the side member 310 may be disposed between the first plate 111 and the display panel 301. The side member 310 may be formed to surround a space between the first plate 111 and the display panel 301.

In an embodiment, the support member 311 may be disposed inside the side member 310. In an embodiment, the support member 311 may include, for example, a metallic material and/or a non-metallic (e.g., polymer) material.

In an embodiment, the support member 311 may support several components of the electronic device 300. For example, the support member 311 may support the second plate 320 and the at least one printed circuit board 340. For example, the second printed circuit board 342 may be disposed on the support member 311 (e.g., the +z direction), and the first printed circuit board 341 may be disposed on the second printed circuit board 342 (e.g., the +z direction) to at least partially overlap the second printed circuit board 342. The second plate 320 may be disposed on the first printed circuit board 341 (e.g., the +z direction) to at least partially overlap the first printed circuit board 341. In an embodiment, the screws 390 may pass through at least one of the second plate 320, the first printed circuit board 341, and/or the second printed circuit board 342 and may be coupled to openings formed in the support member 311, and thus the second plate 320, the first printed circuit board 341, and the second printed circuit board 342 may be coupled together and may be supported by the support member 311.

In an embodiment, the support member 311 may be integrally formed with the side member 310 and may extend from the side member 310 toward the inside of the electronic device 300. In another embodiment, the support member 311 may be formed of a component separated from the side member 310 and may be coupled with the side member 310.

In an embodiment, the battery 350, which is a device for supplying power to at least one component of the electronic device 300, may include, for example, a primary cell that is not rechargeable, a secondary cell that is rechargeable, or a fuel cell. In an embodiment, the battery 350 may be at least partially accommodated in a space formed by the support member 311.

In an embodiment, the display panel 301 may be coupled with the side member 310 and/or the support member 311.

In an embodiment, the display panel 301 may include a front plate (e.g., the front plate 111 of FIG. 1), a display (e.g., the display 101 of FIG. 1) disposed on the front plate (e.g., the +z direction), and an electro-magnetic induction panel (e.g., a digitizer). In an embodiment, the electro-magnetic induction panel may be a panel for detecting an input of the pen input device (120 of FIG. 2). In an embodiment, the electro-magnetic induction panel may include a coil and a shielding sheet. An input from the pen input device 120 may be transferred through the coil. The shielding sheet may prevent mutual interference between components due to electro-magnetic fields generated from the components (e.g., the display 101) included in the electronic device 300.

Figure 4A:
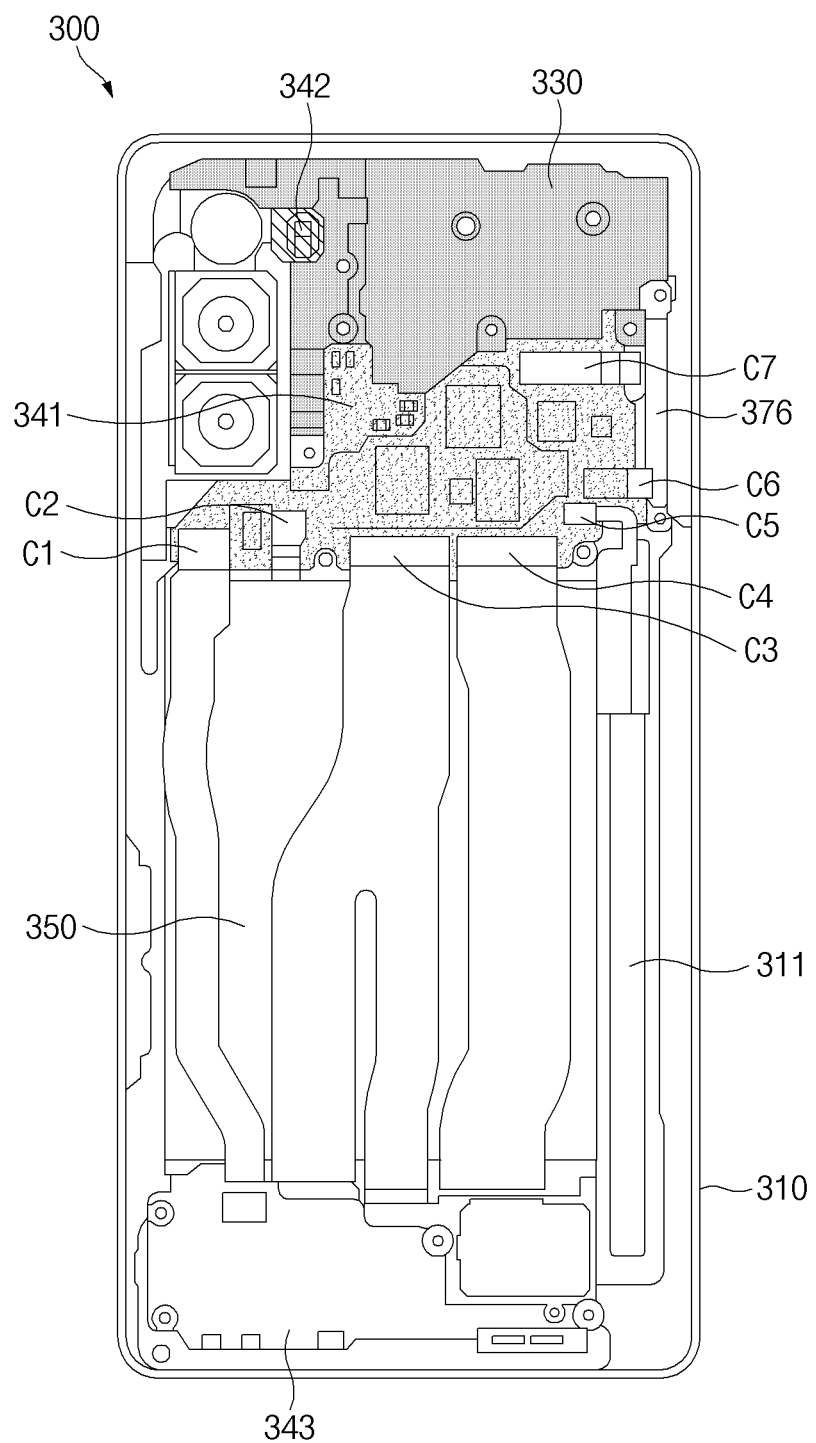
FIG. 4A illustrates an electronic device according to an embodiment of the disclosure.

FIG. 4A illustrates an electronic device according to an embodiment of the disclosure.

FIG. 4A may be a view in which the first plate 111, the second plate 320, and the first antenna 372 are omitted.

Figure 4B:
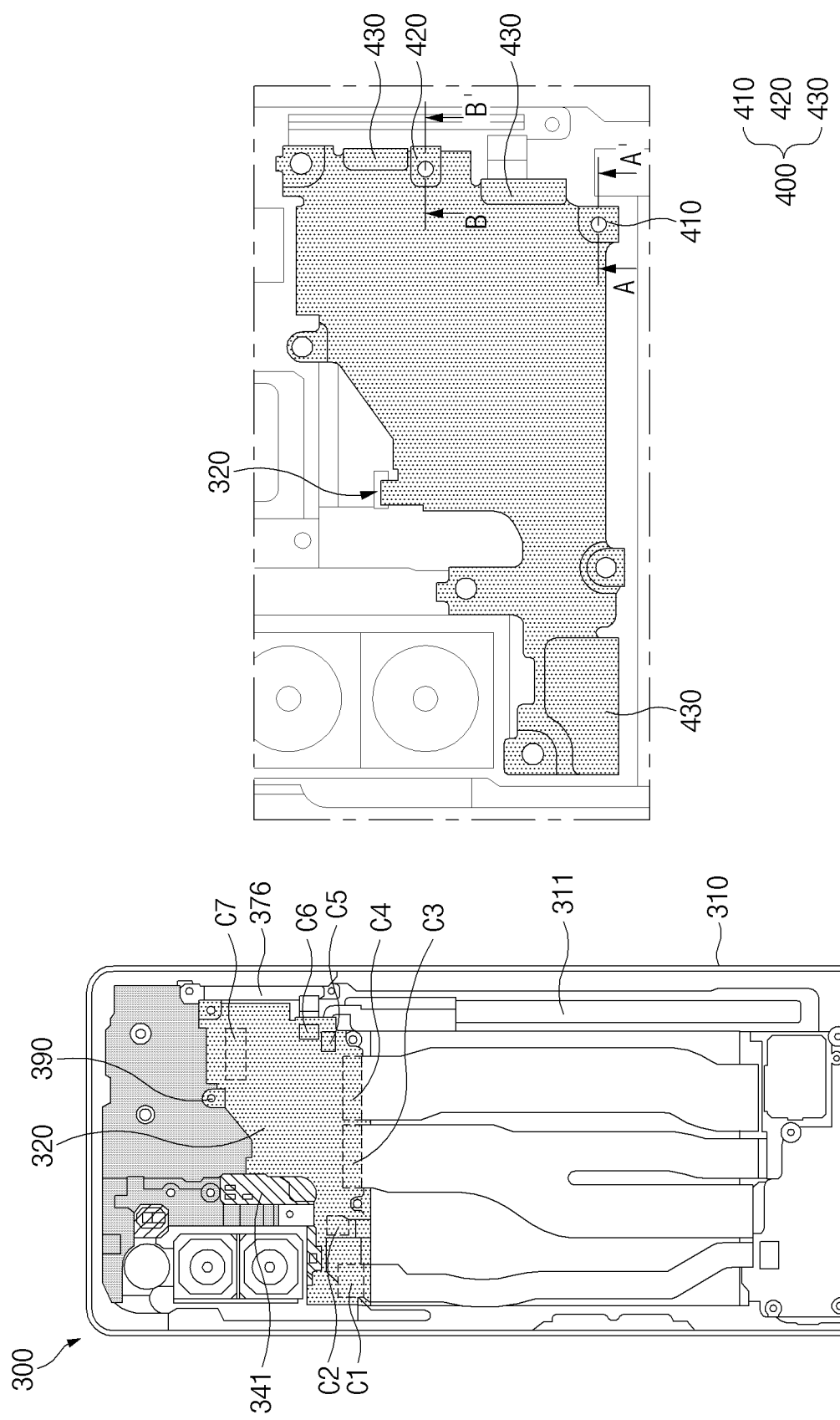
FIG. 4B illustrates an electronic device according to an embodiment of the disclosure.

FIG. 4B illustrates an electronic device according to an embodiment of the disclosure.

FIG. 4B may be a view in which the first plate 111 and the first antenna 372 are omitted.

Figure 4C:
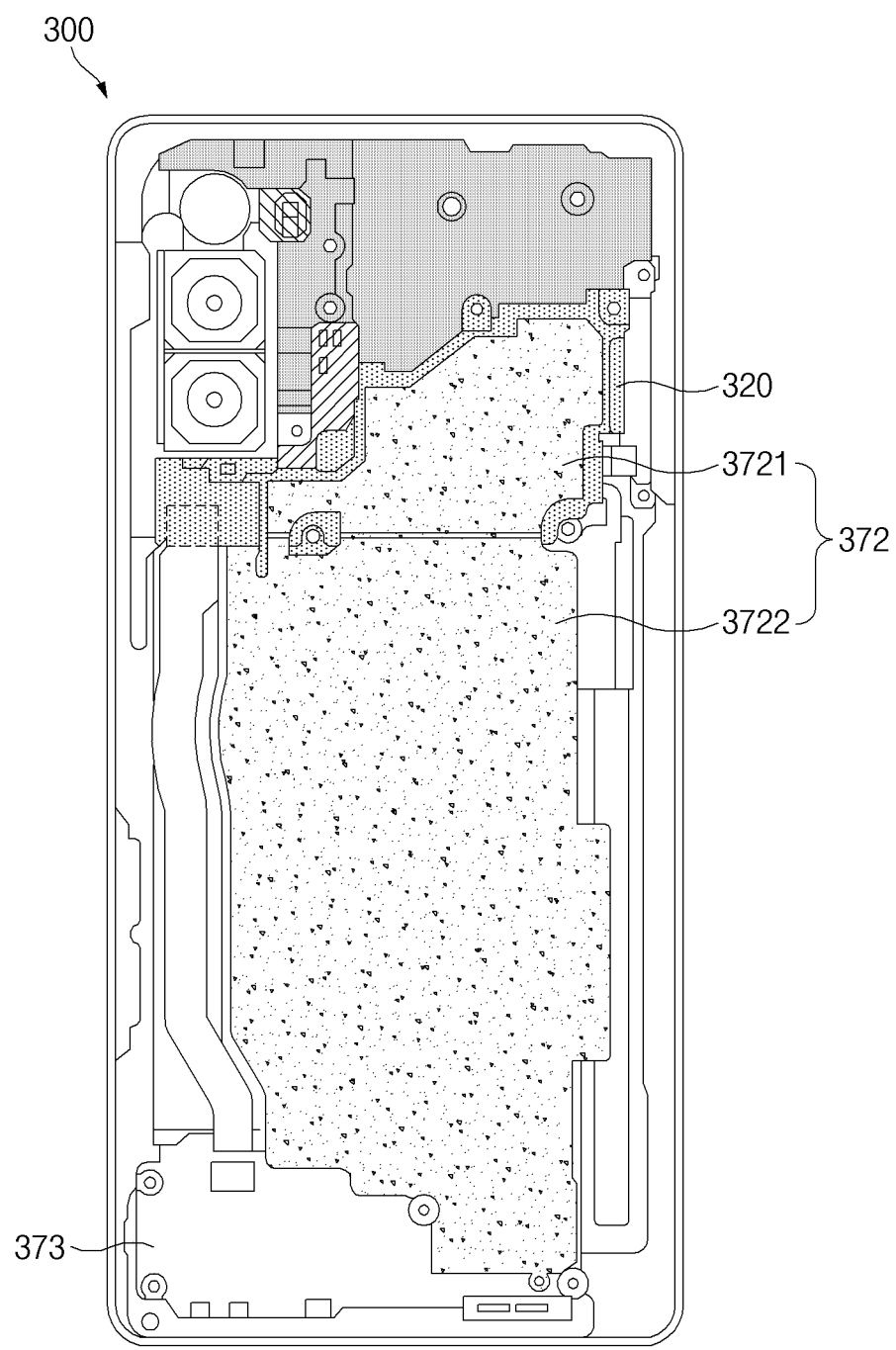
FIG. 4C illustrates an electronic device according to an embodiment of the disclosure.

FIG. 4C illustrates an electronic device according to an embodiment of the disclosure.

FIG. 4C may be a view in which the first plate 111 is omitted.

Referring to FIG. 4A, the first printed circuit board 341 and the second printed circuit board 342 of the electronic device 300 according to an embodiment may partially overlap each other. For example, at least a portion of the first printed circuit board 341 may overlap the second printed circuit board 342. In an embodiment, a portion of the second printed circuit board 342 may be covered by the first printed circuit board 341, and a portion of the second printed circuit board 342 may be covered by the third plate 330.

In an embodiment, a plurality of connectors for operationally connecting various parts of the electronic device 300 may be disposed on the first printed circuit board 341. For example, first to seventh connectors C1 to C7 may be disposed on the first printed circuit board 341.

In an embodiment, signals for operating the electronic device 300 may be input and output through the first to seventh connectors C1 to C7.

For example, a radio frequency (RF) signal in a specified band may be transmitted and received through the first connector C1.

For example, the second connector C2 may be electrically connected with the battery 350. A power management module (e.g., 1388 of FIG. 13) disposed on the first printed circuit board 341 or the second printed circuit board 342 and the battery 350 may be electrically connected through the second connector C2. The power management module may provide power required for other parts of the electronic device 300 by using the battery 350.

For example, the third connector C3 may electrically connect the first printed circuit board 341 and the third printed circuit board 343 to each other. In another example, an electrical signal related to an interface (e.g., a universal serial bus (USB)) may be input and output through the third connector C3.

For example, the fourth connector C4 may be electrically connected with the display 101, and power and data (or, information) for displaying visual information using the display 101 may be provided through the fourth connector C4.

For example, the fifth connector C5 may be used to transmit and receive a signal related to the pen input device 120. For example, an electrical signal for determining whether the pen input device 120 is accommodated in the electronic device 300 may be input and output through the fifth connector C5.

For example, the sixth connector C6 may be connected with the second antenna 376. Through the sixth connector C6, power required for the second antenna 376 may be provided, a wireless signal desired to be transmitted to the second antenna 376 may be provided, or a wireless signal obtained from the second antenna 376 may be received.

For example, the seventh connector C7 may be connected with the electro-magnetic induction panel of the display panel 301. A signal input to the electro-magnetic induction panel using the pen input device 120 may be provided through the seventh connector C7.

However, configurations and functions of the first to seventh connectors C1 to C7 are not limited by the above examples, and various design changes may be possible. For example, one or more of the first to seventh connectors C1 to C7 may be disposed at positions different from those illustrated. In another example, one or more of the first to seventh connectors C1 to C7 may perform functions different from those described above. In another example, some of the first to seventh connectors C1 to C7 may be omitted, or other connector(s) not illustrated may be further included.

Referring to FIG. 4B, the second plate 320 according to an embodiment may be disposed on the first printed circuit board 341 by being coupled with the support member 311. In an embodiment, the second plate 320 may be coupled with the support member 311 through at least one of the screws 390.

In an embodiment, the second plate 320 may overlap at least a portion of the first printed circuit board 341. In an embodiment, the second plate 320 may protect the first printed circuit board 341 from an external impact by covering at least a portion of the first printed circuit board 341.

In an embodiment, the second plate 320 may be formed of a material having thermal conductivity appropriate for dissipating heat generated by various components (e.g., the second antenna 376) of the electronic device 300. For example, the second plate 320 may include a clad metal having copper disposed on a central portion thereof and stainless steel disposed on opposite sides of the central portion, but is not limited thereto.

In an embodiment, the second plate 320 may overlap the first to seventh connectors C1 to C7 coupled with the first printed circuit board 341. In an embodiment, the second plate 320 may prevent separation of the first to seventh connectors C1 to C7 from the first printed circuit board 341.

In an embodiment, the second plate 320 may include a stacked structure 400. In an embodiment, the stacked structure 400 may be formed on the periphery of the second plate 320.

In an embodiment, the stacked structure 400 may include a first stacked structure 410, a second stacked structure 420, and a third stacked structure 430. Although not illustrated, the stacked structure 400 according to an embodiment may include a fourth stacked structure (e.g., a fourth stacked structure 440 of FIG. 12A).

In an embodiment, the third stacked structure 430 may overlap at least some of the first to seventh connectors C1 to C7.

In an embodiment, the positions and/or numbers of first stacked structures 410, second stacked structure 420, and third stacked structures 430 are not limited by the illustrated example.

Referring to FIG. 4C, the first antenna 372 according to an embodiment may be disposed on the second plate 320. In an embodiment, the first antenna 372 may include a first portion 3721 overlapping the second plate 320 and a second portion 3722 extending from the first portion 3721 to the third printed circuit board 343. In an embodiment, the first antenna 372 may be attached to the second plate 320. For example, the first portion 3721 of the first antenna 372 may be attached to the second plate 320 through an adhesive member, such as a double-sided tape. In an embodiment, the shape of the first portion 3721 may be substantially similar to the shape of the second plate 320, but is not limited thereto.

Figure 5A:
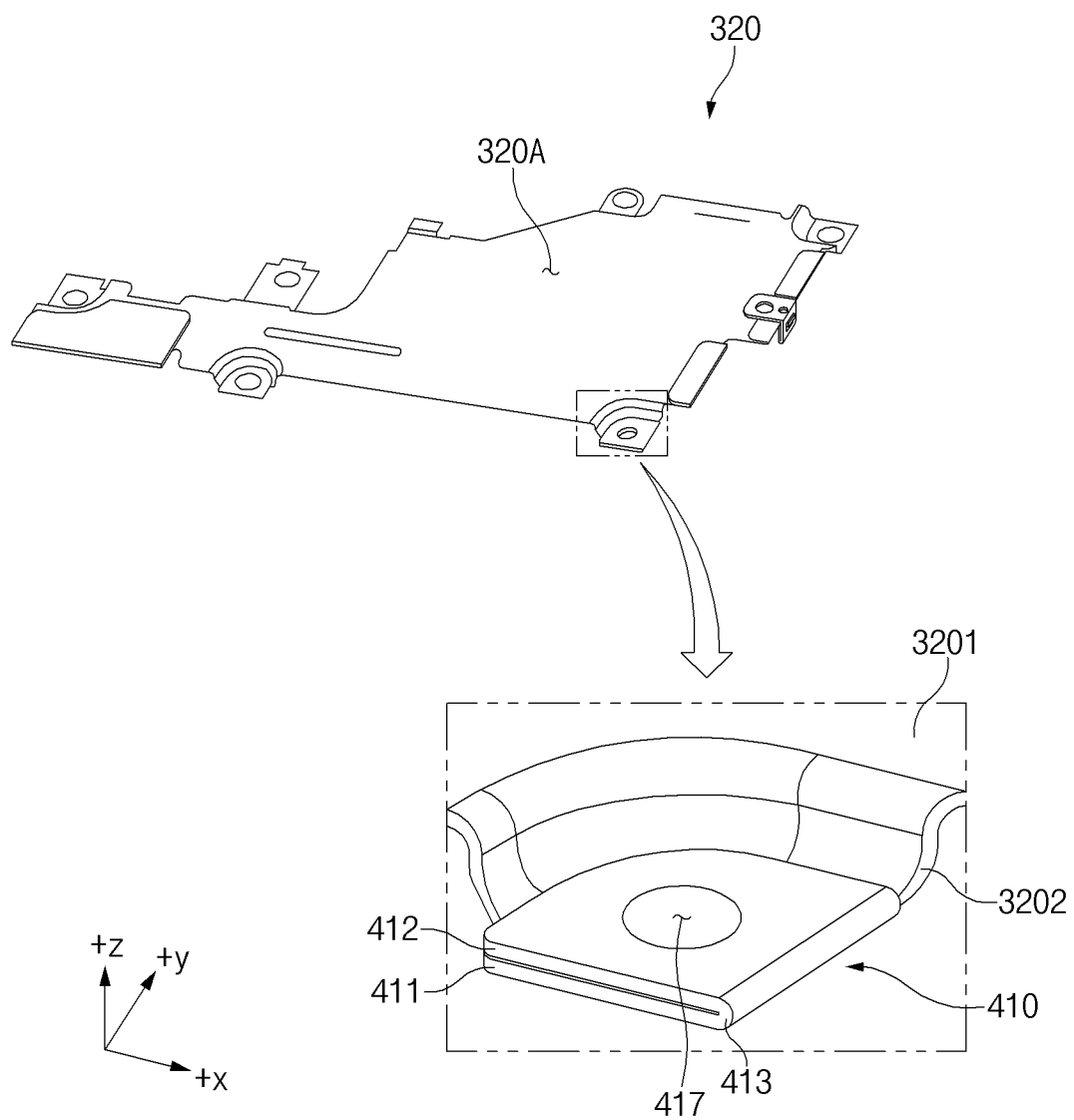
FIG. 5A illustrates a second plate and a first stacked structure of a second plate according to an embodiment of the disclosure.

FIG. 5A illustrates a second plate and a first stacked structure of the second plate according to an embodiment of the disclosure.

Figure 5B:
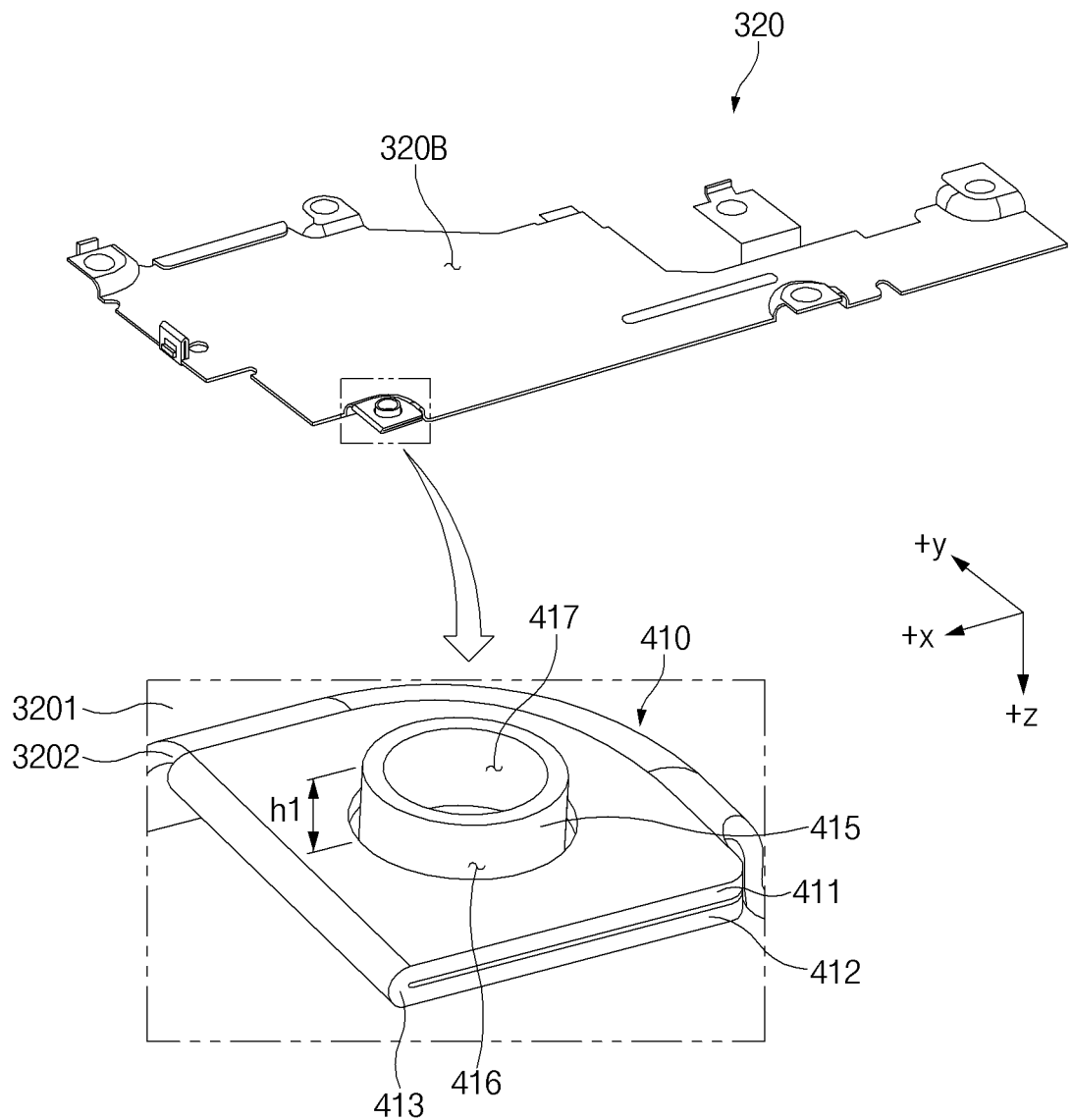
FIG. 5B illustrates a second plate and a first stacked structure of the second plate according to an embodiment of the disclosure.

FIG. 5B illustrates a second plate and a first stacked structure of the second plate according to an embodiment of the disclosure.

Figure 5C:
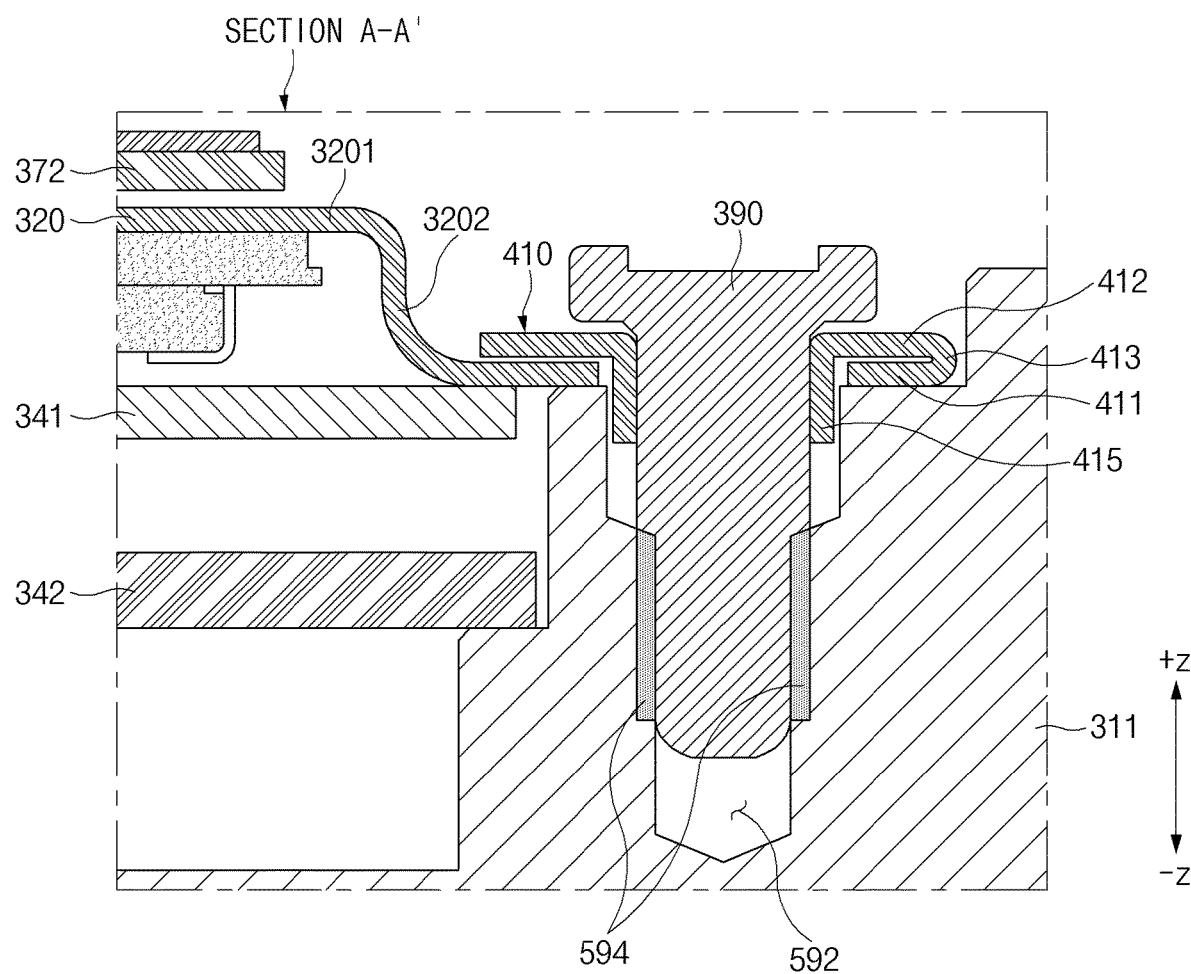
FIG. 5C is a sectional view illustrating a first stacked structure according to an embodiment of the disclosure.

FIG. 5C is a sectional view illustrating a first stacked structure according to an embodiment of the disclosure. FIG. 5C may be a sectional view taken along line A-A' of FIG. 4B.

Referring to FIGS. 5A, 5B, and 5C, the second plate 320 according to an embodiment may include a first surface 320A and a second surface 320B. The first antenna 372 may be disposed on the first surface 320A, and the first printed circuit board 341 and the support member 311 may be disposed under the second surface 320B. For example, the first antenna 372 may be disposed in the +z direction with respect to the second plate 320, and the first printed circuit board 341 and the support member 311 may be disposed in the −z direction with respect to the second plate 320.

In an embodiment, the second plate 320 may include a first portion 3201 and a second portion 3202. The first portion 3201 may be formed to be substantially flat. The second portion 3202 may be bent from the first portion 3201 and may extend from the first portion 3201 to have a height different from that of the first portion 3201.

In an embodiment, the second plate 320 may include the first stacked structure 410. In an embodiment, the first stacked structure 410 may be formed on the periphery of the second plate 320. For example, the first stacked structure 410 may be formed on the periphery of the second portion 3202. In another example, unlike that illustrated, the first stacked structure 410 may be formed on the periphery of the first portion 3201. In an embodiment, the first stacked structure 410 may be formed on the periphery of the second portion 3202 and may be located at a height different from that of the first portion 3201. Alternatively, in another embodiment, the first stacked structure 410 may be formed on the periphery of the first portion 3201 and may be located at substantially the same height as the first portion 3201.

In an embodiment, the first stacked structure 410 may include a first layer 411, a second layer 412, a connecting portion 413, and a first protrusion 415.

In an embodiment, the first layer 411 may extend from the second plate 320. In an embodiment, the second layer 412 may be disposed on the first layer 411. For example, the second layer 412 may be disposed on a surface of the first layer 411 that corresponds to the first surface 320A of the second plate 320. In another example, the second layer 412 may be disposed on a surface of the first layer 411 that extends from the first surface 320A. In another example, the second layer 412 may be disposed in the +z direction with respect to the first layer 411.

In an embodiment, the connecting portion 413 may extend from one end of the first layer 411 to one end of the second layer 412.

In an embodiment, the first protrusion 415 may extend from the second layer 412 toward the support member 311. For example, the first protrusion 415 may extend from the second layer 412 toward the front surface of the electronic device 300 (e.g., the front surface 110A of FIG. 1). In another example, the first protrusion 415 may extend from the second layer 412 toward the display (e.g., 101 of FIG. 1). In another example, the first protrusion 415 may extend from the second layer 412 in the −z direction.

In an embodiment, the first protrusion 415 may penetrate the first layer 411 and may protrude outward from the first layer 411. For example, the first protrusion 415 may pass through an opening 416 formed in the first layer 411 and may protrude from the first layer 411 by a specified height h1. In an embodiment, the first protrusion 415 may have an opening 417 formed therein into which the screw 390 is inserted.

Referring to FIG. 5C, the first protrusion 415 according to an embodiment may be at least partially inserted into a first opening 592 formed in the support member 311. In an embodiment, the screw 390 may pass through the first protrusion 415 and may be inserted into the first opening 592 of the support member 311. As the screw 390 is fastened to a coupling portion 594 formed in the support member 311, the second plate 320 may be coupled with the support member 311. In an embodiment, the first opening 592 of the support member 311 may have different diameters so as to accommodate both the first protrusion 415 and the screw 390.

In an embodiment, the first protrusion 415 inserted into the first opening 592 of the support member 311 may prevent movement of the second plate 320 in a horizontal direction. For example, as the first protrusion 415 is constrained to the first opening 592, movement of the second plate 320 in the x-y plane direction may be restricted.

In an embodiment, since the position of the second plate 320 is fixed by the first protrusion 415, an error in the position where the second plate 320 is disposed may be reduced. Accordingly, misalignment of the second plate 320 on the first printed circuit board 341 may be prevented, and defective fastening of the screw 390 may be reduced.

In an embodiment, since the position of the second plate 320 is constrained by the first protrusion 415, an error in the position of the first antenna 372 attached to the second plate 320 may be reduced. Accordingly, performance degradation of the first antenna 372 due to a position error may be reduced.

In an embodiment, the first stacked structure 410 may improve the stiffness of the second plate 320. For example, by forming a hemming structure in which the first layer 411 and the second layer 412 are superimposed on each other, the first stacked structure 410 may improve the stiffness of the second plate 320. In an embodiment, the first stacked structure 410 may prevent the second plate 320 from being deformed by an external force depending on fastening the screw 390. In an embodiment, even though the second plate 320 includes the clad metal having a relatively high thermal conductivity and a relatively low stiffness for heat dissipation of the electronic device 300, the first stacked structure 410 may supplement the stiffness of the second plate 320.

In an embodiment, the first stacked structure 410 may be manufactured through a process that those skilled in the art can apply. For example, the stacked structure of the first layer 411 and the second layer 412 may be formed through bending and hamming processes, and the first protrusion 415 may be formed through piercing and drawing. A restriking process for adjusting the shape and dimensions may be performed after the piercing and drawing.

Figure 6A:
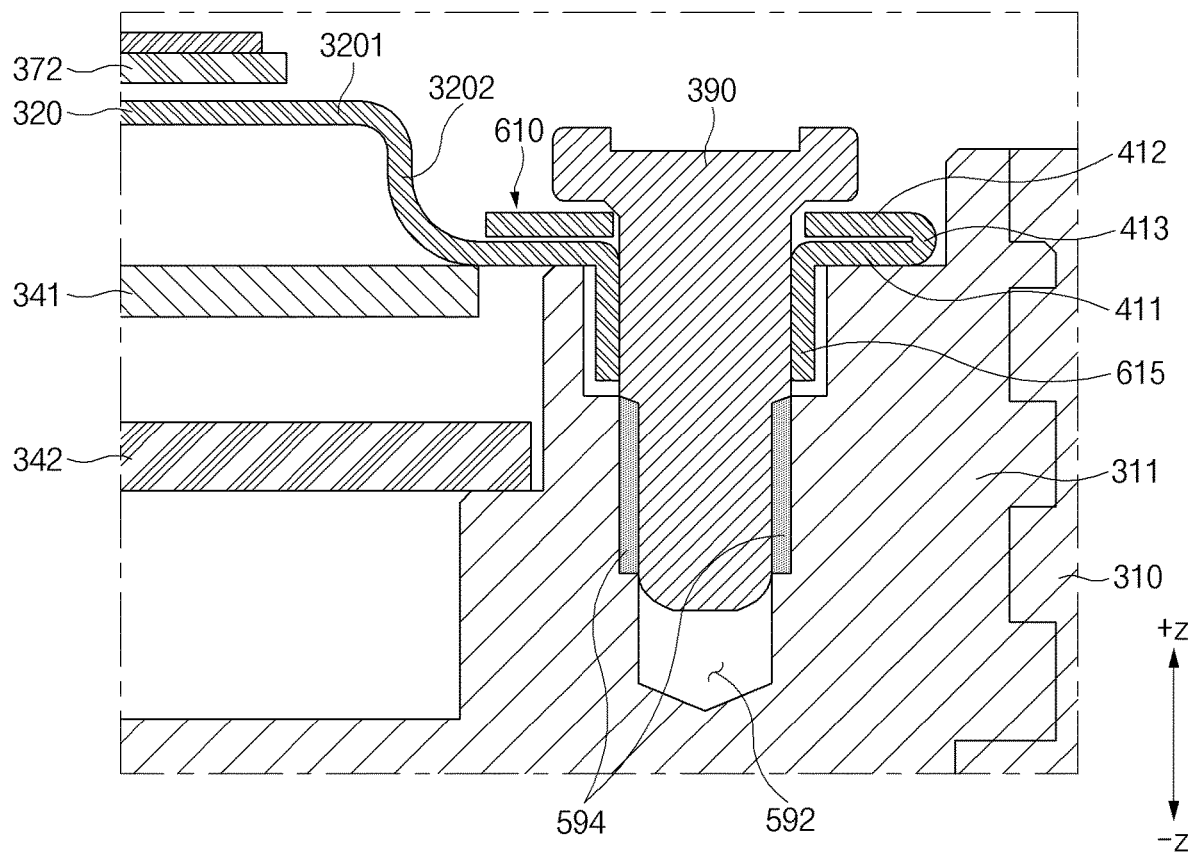
FIG. 6A illustrates a first stacked structure according to an embodiment of the disclosure.

FIG. 6A illustrates a first stacked structure according to an embodiment of the disclosure.

Figure 6B:
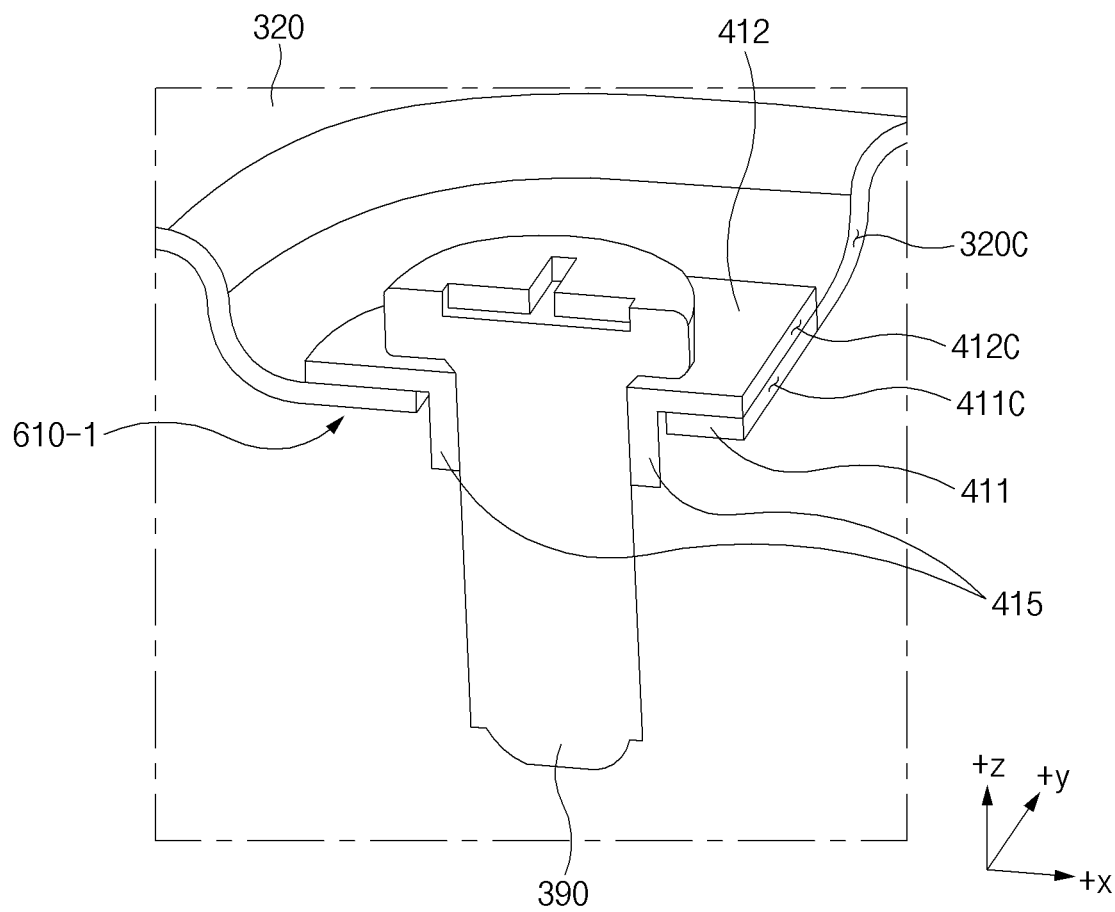
FIG. 6B illustrates a first stacked structure according to an embodiment of the disclosure.

FIG. 6B illustrates a first stacked structure according to an embodiment of the disclosure.

Figure 6C:
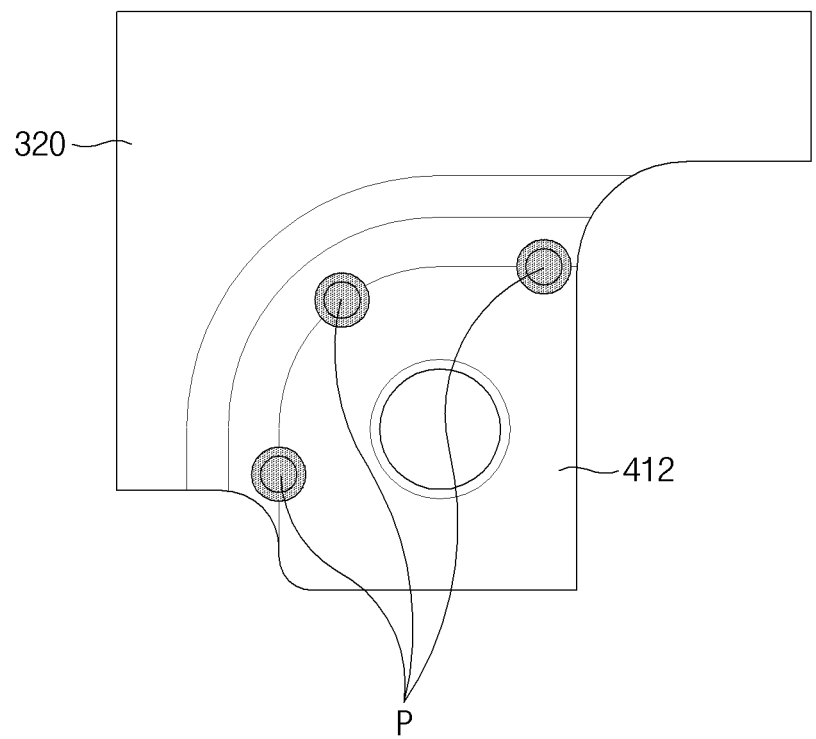
FIG. 6C illustrates a first stacked structure according to an embodiment of the disclosure.

FIG. 6C illustrates a first stacked structure according to an embodiment of the disclosure.

Referring to FIG. 6A, the electronic device 300 according to an embodiment may include the first stacked structure 610 included in the second plate 320. In FIG. 6A, repetitive descriptions of components having the same reference numerals as the above-described components will be omitted.

In an embodiment, the first stacked structure 610 may include a first protrusion 615. In an embodiment, the first protrusion 615 may extend from a first layer 411 toward the support member 311 (e.g., in the −z direction) and may be at least partially inserted into a first opening 592 formed in the support member 311. In an embodiment, unlike the first protrusion 415 of FIG. 5A that extends from the second layer 412, the first protrusion 615 of the first stacked structure 610 of FIG. 6A may extend from the first layer 411.

Referring to FIG. 6B, the electronic device 300 according to an embodiment may include the first stacked structure 610-1 included in the second plate 320. In FIG. 6B, repetitive descriptions of components having the same reference numerals as the above-described components will be omitted.

In an embodiment, the first stacked structure 610-1 may not include a connecting portion (e.g., the connecting portion 413 of FIG. 4A) connected from one end of a first layer 411 to one end of a second layer 412. In an embodiment, the first layer 411 and the second layer 412 may be bonded through laser welding. For example, referring to FIG. 6C, welding may be performed on at least one point P on an edge region of the second layer 412 to bond the first layer 411 and the second layer 412.

In an embodiment, since the connecting portion is removed, the volume of the second plate 320 may be decreased, and the mountability of the second plate 320 may be improved.

In an embodiment, an edge surface 411C of the first layer 411 and an edge surface 412C of the second layer 412 are illustrated as being formed without a step with an edge surface 320C of the second plate 320 by using a computer numerical control (CNC) process. However, the disclosure is not limited thereto. For example, the edge surface 411C of the first layer 411 and/or the edge surface 412C of the second layer 412 may protrude in the +x direction, or may be recessed in the −x direction, to have a step with the edge surface 320C of the second plate 320. The shape of the edge surface 411C of the first layer 411 and/or the edge surface 412C of the second layer 412 may vary depending on the interval with another part (e.g., the support member 311) adjacent to the second plate 320.

The description of the first stacked structure 610-1 not including the connecting portion as illustrated in FIG. 6B may be substantially identically, similarly, or correspondingly applied to the first stacked structure 410 of FIG. 5A and/or the first stacked structure 610 of FIG. 6A. For example, the first stacked structure 410 of FIG. 5A and/or the first stacked structure 610 of FIG. 6A may not include the connecting portion 413.

Figure 7A:
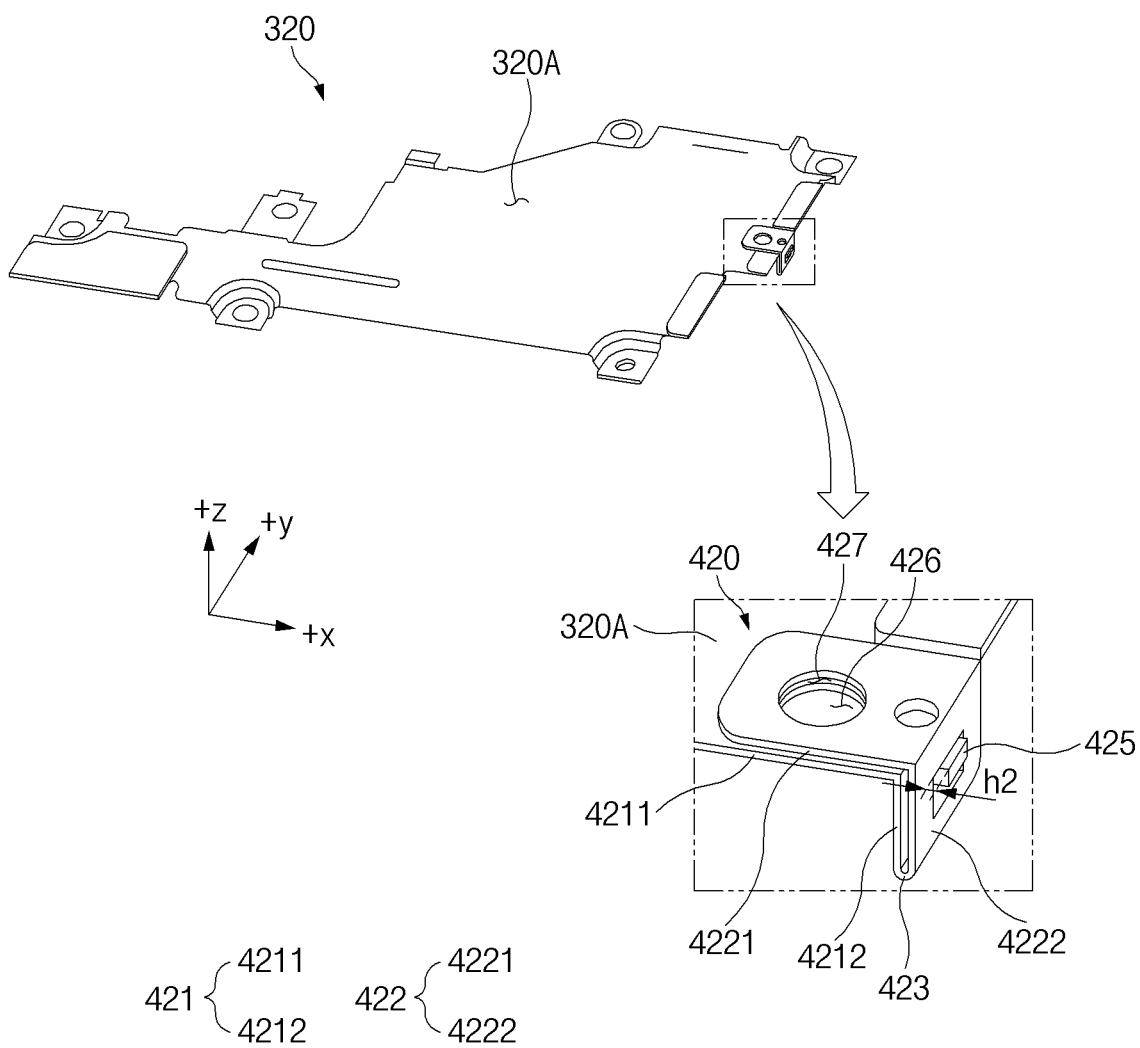
FIG. 7A illustrates a second plate and a second stacked structure of the second plate according to an embodiment of the disclosure.

FIG. 7A illustrates a second plate and a second stacked structure of the second plate according to an embodiment of the disclosure.

Figure 7B:
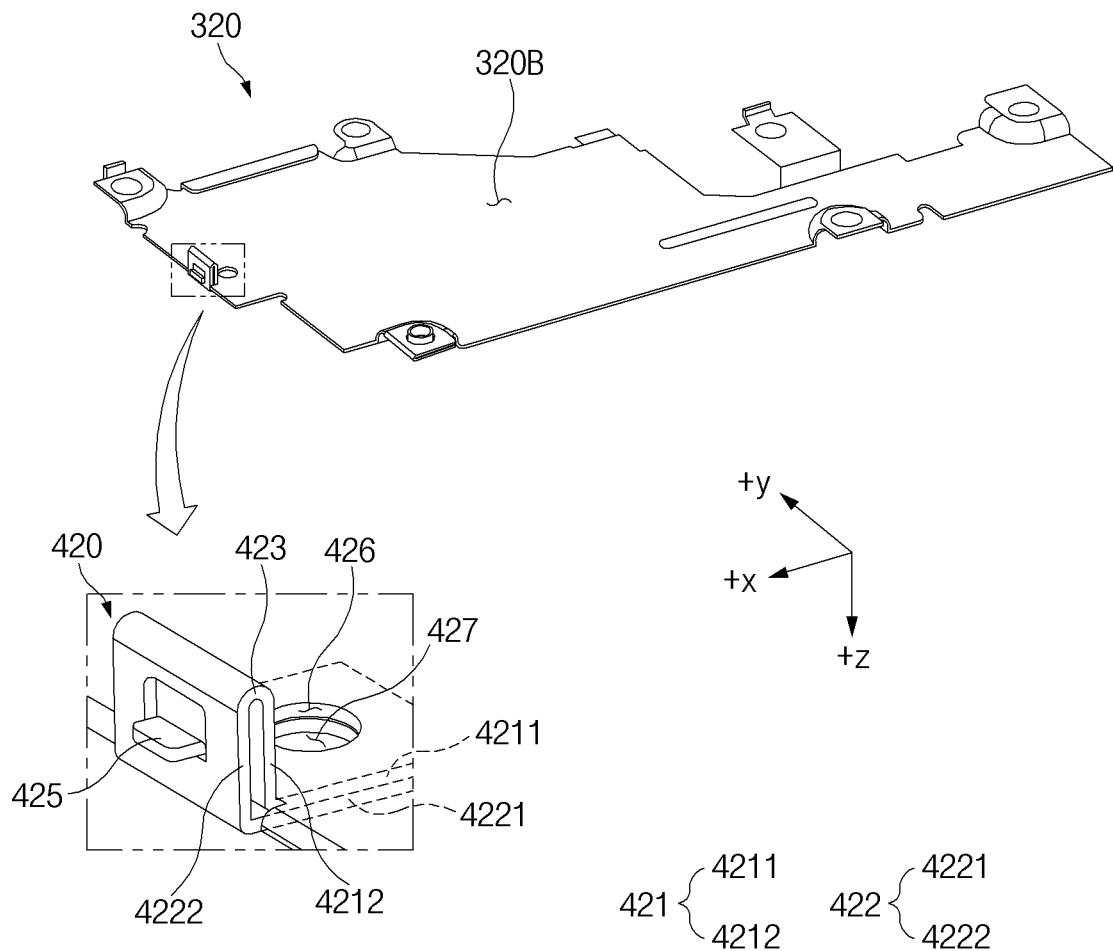
FIG. 7B illustrates a second plate and a second stacked structure of the second plate according to an embodiment of the disclosure.

FIG. 7B illustrates a second plate and a second stacked structure of the second plate according to an embodiment of the disclosure.

Figure 7C:
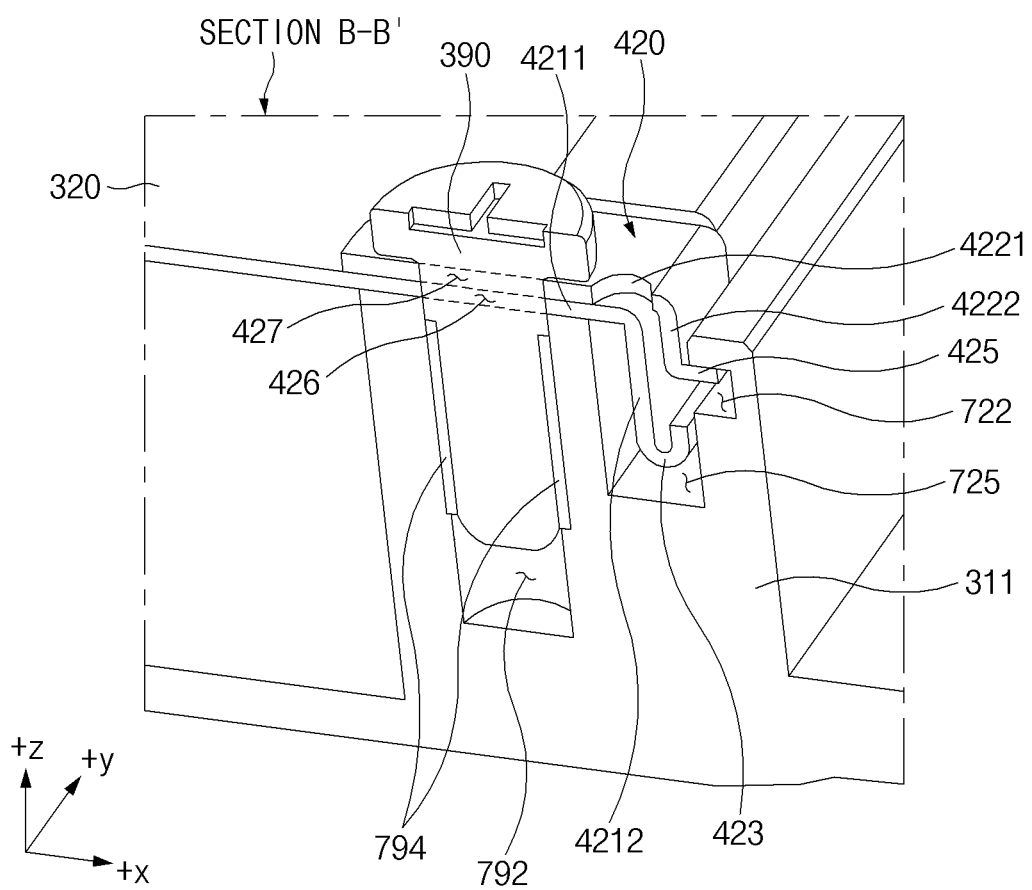
FIG. 7C is a sectional view illustrating a second stacked structure according to an embodiment of the disclosure.

FIG. 7C is a sectional view illustrating a second stacked structure according to an embodiment of the disclosure.

FIG. 7C may be a sectional view taken along line B-B' of FIG. 4B.

Referring to FIGS. 7A, 7B, and 7C, the second plate 320 according to an embodiment may include the second stacked structure 420.

In an embodiment, the second stacked structure 420 may be formed on the periphery of the second plate 320. In an embodiment, the second stacked structure 420 may include a first layer 421, a second layer 422, a connecting portion 423, and a second protrusion 425.

In an embodiment, the first layer 421 of the second stacked structure 420 may extend from the second plate 320. In an embodiment, the first layer 421 may include a first portion 4211 extending from the second plate 320 and a second portion 4212 extending from the first portion 4211 to the connecting portion 423. In an embodiment, the first portion 4211 may form substantially the same layer as the second plate 320. In an embodiment, the second portion 4212 may be bent from the first portion 4211 and may extend in a direction different from that of the first portion 4211. For example, the first portion 4211 may extend along the x-y plane, and the second portion 4212 may extend in the −z direction substantially perpendicular to the first portion 4211. In another example, the first portion 4211 may extend in a direction substantially parallel to the front surface (e.g., 110A of FIG. 1) of the electronic device 300, and the second portion 4212 may extend toward the front surface of the electronic device 300. In another example, the second portion 4212 may extend from the first portion 4211 toward the display (e.g., 101 of FIG. 1). In an embodiment, one end of the second portion 4212 may be connected with the connecting portion 423, and an opposite end of the second portion 4212 may be connected with the first portion 4211.

In an embodiment, the second layer 422 disposed on the first layer 421 may include a third portion 4221 and a fourth portion 4222. In an embodiment, the third portion 4221 of the second layer 422 may be disposed on the first portion 4211 of the first layer 421. In an embodiment, the fourth portion 4222 of the second layer 422 may be disposed to face the second portion 4212 of the first layer 421.

In an embodiment, the fourth portion 4222 of the second layer 422 may extend in a direction substantially parallel to the second portion 4212 of the first layer 421. In an embodiment, one end of the fourth portion 4222 of the second layer 422 may be connected with the connecting portion 423, and an opposite end of the fourth portion 4222 may be connected with the third portion 4221. In an embodiment, the third portion 4221 of the second layer 422 may be bent from the fourth portion 4222 and may extend from the fourth portion 4222 in a direction substantially parallel to the first portion 4211.

In an embodiment, the first layer 421 and the second layer 422 may be at least partially brought into contact with each other. For example, the first portion 4211 of the first layer 421 may be brought into contact with the third portion 4221 of the second layer 422, and the second portion 4212 of the first layer 421 may be spaced apart from the fourth portion 4222 of the second layer 422. In another example, unlike that illustrated, all of the first layer 421 may be brought into contact with the second layer 422.

In an embodiment, the first layer 421 and the second layer 422 may have openings 426 and 427 formed therein into which the screw 390 is inserted.

In an embodiment, the connecting portion 423 may extend from one end of the first layer 421 to one end of the second layer 422. For example, the connecting portion 423 may extend from the second portion 4212 of the first layer 421 to the fourth portion 4222 of the second layer 422.

In an embodiment, the second protrusion 425 may extend from the second layer 422 in a direction away from the second plate 320. In an embodiment, the second protrusion 425 may extend from the second layer 422 toward the side surface of the electronic device 300 (e.g., the side surface 110C of FIG. 1). In an embodiment, the second protrusion 425 may extend from the second layer 422 toward the side member (e.g., the side member 310 of FIG. 4A). For example, the second protrusion 425 may extend from the fourth portion 4222 of the second layer 422 in a direction substantially parallel to the x-y plane. For example, the second protrusion 425 may extend from the fourth portion 4222 of the second layer 422 in the +x direction.

In an embodiment, the second protrusion 425 may protrude outward from the second layer 422. For example, the second protrusion 425 may protrude outward from the fourth portion 4222 of the second layer 422 by a specified height h2.

Referring to FIG. 7C, in an embodiment, the screw 390 may penetrate the first layer 421 and the second layer 422 of the second stacked structure 420. For example, the screw 390 may be inserted into the opening 426 formed in the first portion 4211 of the first layer 421 and the opening 427 formed in the third portion 4221 of the second layer 422. In an embodiment, the screw 390 may be inserted into a second opening 792 formed in the support member 311. In an embodiment, as the screw 390 is fastened to a coupling portion 794 formed in the support member 311, the second plate 320 may be coupled with the support member 311.

In an embodiment, a first stopping recess 722 and a second stopping recess 724 may be formed in the support member 311.

In an embodiment, the first stopping recess 722 may have a shape corresponding to the shape of the second protrusion 425, and the second protrusion 425 may be at least partially inserted into the first stopping recess 722. In an embodiment, the second protrusion 425 inserted into the first stopping recess 722 may prevent movement of the second plate 320 in a vertical direction. For example, as the second protrusion 425 is constrained by the first stopping recess 722, movement of the second plate 320 in the z-axis direction may be restricted.

In an embodiment, a portion of the second stacked structure 420 may be inserted into the second stopping recess 724. For example, at least one of the second portion 4212, the fourth portion 4222, and/or the connecting portion 423 of the second stacked structure 420 may be at least partially accommodated in the second stopping recess 724. In an embodiment, the second stacked structure 420 partially inserted into the second stopping recess 724 may prevent movement of the second plate 320 in a horizontal direction. For example, as the second stacked structure 420 is constrained by the second stopping recess 724, movement of the second plate 320 in the x-y plane direction may be restricted.

In an embodiment, since movement of the second plate 320 is restricted by the second stacked structure 420, misalignment of the second plate 320 before or after the screw 390 is fastened may be prevented.

In an embodiment, the second stacked structure 420 may improve the stiffness of the second plate 320. For example, by forming a hemming structure in which the first layer 421 and the second layer 422 are superimposed on each other, the second stacked structure 420 may improve the stiffness of the second plate 320. In an embodiment, the second stacked structure 420 may prevent the second plate 320 from being deformed by an external force depending on fastening the screw 390.

In an embodiment, the second stacked structure 420 may be manufactured through a process that those skilled in the art can apply. For example, the second protrusion 425 may be formed by performing piercing and drawing on the second plate 320, and the second stacked structure 420 in which the first layer 421 and the second layer 422 are stacked on each other may be formed by performing bending and hamming on the second plate 320 having the second protrusion 425 formed thereon.

Figure 8:
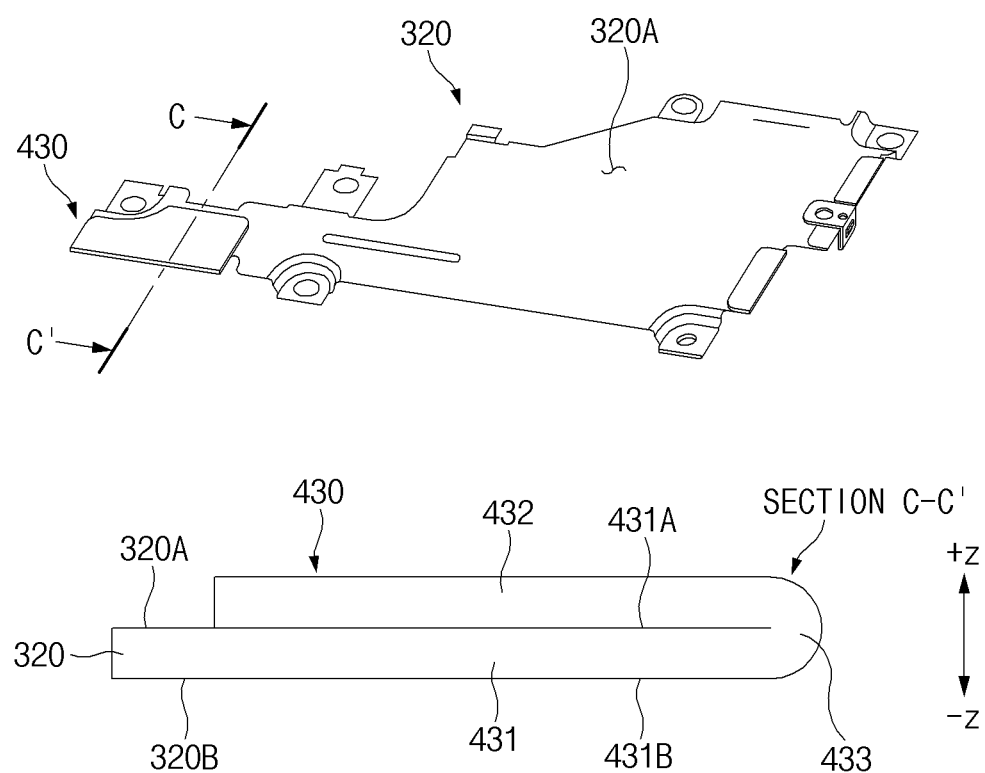
FIG. 8 illustrates a second plate and a third stacked structure according to an embodiment of the disclosure.

FIG. 8 illustrates a second plate and a third stacked structure according to an embodiment of the disclosure.

FIG. 8 may be a sectional view taken along line C-C'.

Referring to FIG. 8, the second plate 320 according to an embodiment may include the third stacked structure 430. In an embodiment, the third stacked structure 430 may be formed on the periphery of the second plate 320.

In an embodiment, the third stacked structure 430 may include a first layer 431, a second layer 432, and a connecting portion 433.

In an embodiment, the first layer 431 may extend from the second plate 320. In an embodiment, the first layer 431 may form substantially the same layer as the second plate 320.

In an embodiment, the second layer 432 may be disposed on the first layer 431 (e.g., the +z direction). For example, the second layer 432 may be disposed on a first surface 431A of the first layer 431. In an embodiment, the first surface 431A of the first layer 431 may correspond to the first surface 320A of the second plate 320. For example, the first surface 431A of the first layer 431 may extend from the first surface 320A of the second plate 320. In an embodiment, the second layer 432 may be in contact with the first layer 431.

In an embodiment, the connecting portion 433 may extend from one end of the first layer 431 to one end of the second layer 432.

In an embodiment, the third stacked structure 430 may improve the stiffness of the second plate 320. For example, by forming a hemming structure in which the first layer 431 and the second layer 432 are superimposed on each other, the third stacked structure 430 may improve the stiffness of the second plate 320.

In an embodiment, the third stacked structure 430 may overlap at least one of connectors of the first printed circuit board 341 (e.g., the first to seventh connectors C1 to C7 of FIG. 4B). When a portion where a connector and the second plate 320 overlap each other is deformed, the connector may be separated from the first printed circuit board 341. In an embodiment, the third stacked structure 430 that cover the connectors may prevent separation of the connectors due to deformation of the second plate 320.

In another embodiment, the second layer 432 of the third stacked structure 430 may be disposed under the first layer 431 (e.g., the −z direction). For example, the second layer 432 of the third stacked structure 430 may be disposed on a second surface 431B of the first layer 431. In an embodiment, the second surface 431B of the first layer 431 may correspond to the second surface 320B of the second plate 320. For example, the second surface 431B of the first layer 431 may extend from the second surface 320B of the second plate 320.

Figure 9A:
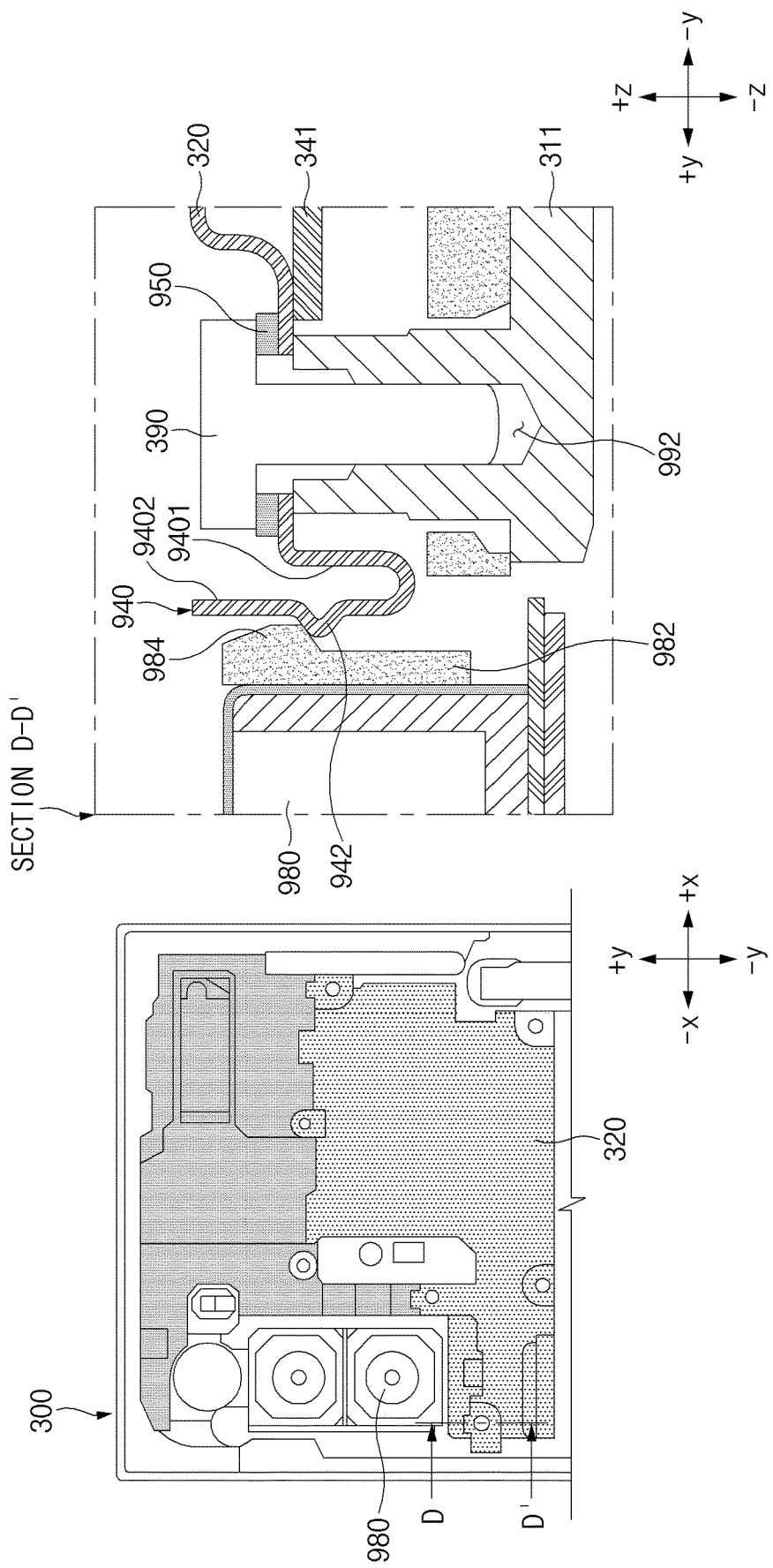
FIG. 9A is a view illustrating a first stopping structure of an electronic device according to an embodiment of the disclosure.

FIG. 9A is a view illustrating a first stopping structure of an electronic device according to an embodiment of the disclosure.

Figure 9B:
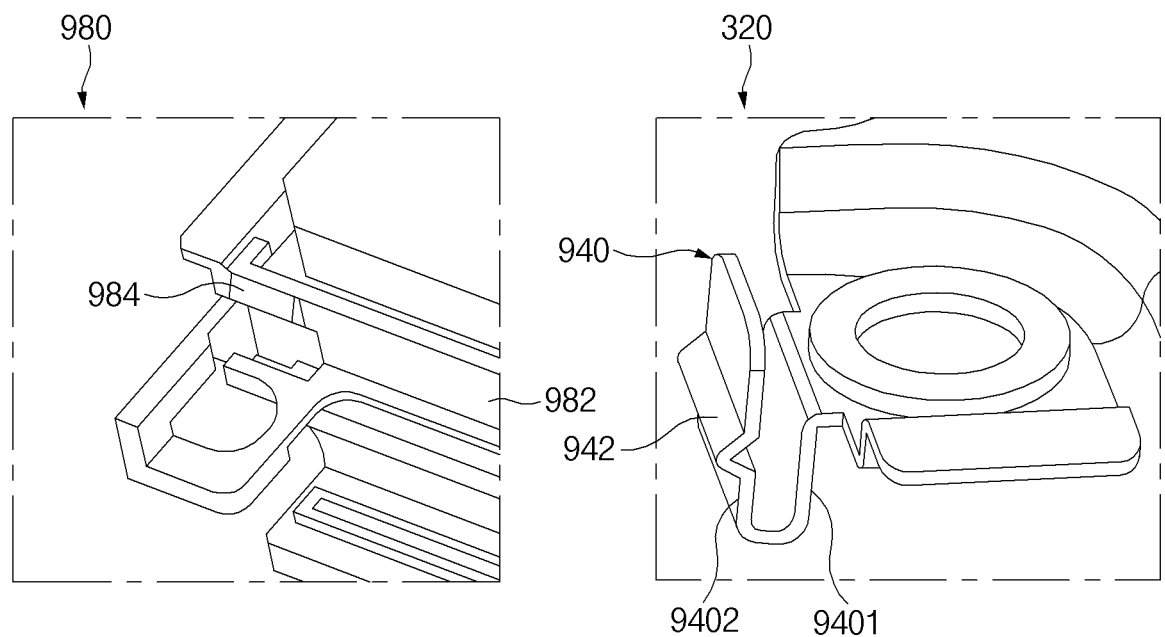
FIG. 9B is a partial perspective view of a camera module and a second plate according to an embodiment of the disclosure.

FIG. 9B is a partial perspective view of a camera module and a second plate according to an embodiment of the disclosure.

Figure 9C:
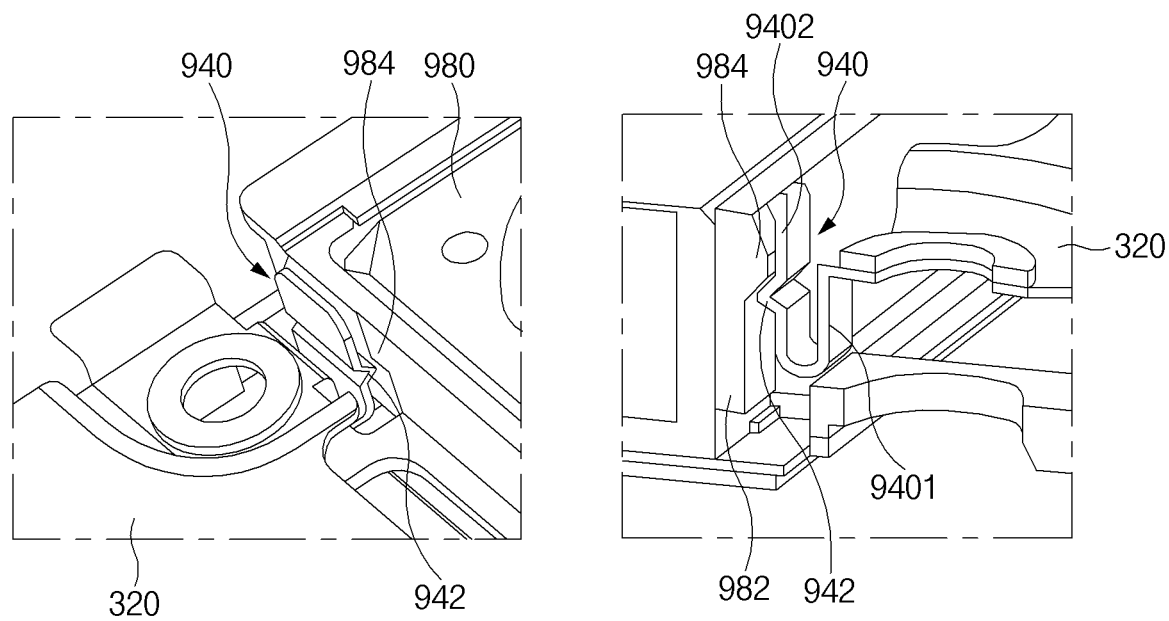
FIG. 9C is a partial perspective view illustrating a state in which a camera module and a second plate are coupled according to an embodiment of the disclosure.

FIG. 9C is a partial perspective view illustrating a state in which a camera module and a second plate are coupled according to an embodiment of the disclosure.

Referring to FIGS. 9A, 9B, and 9C, the electronic device 300 according to an embodiment may include the camera module 980 (e.g., a camera module 1380 of FIG. 13) disposed in a position adjacent to the second plate 320.

In an embodiment, the second plate 320 may include the first stopping structure 940. In an embodiment, the first stopping structure 940 may be formed on the periphery of the second plate 320. In an embodiment, the first stopping structure 940 may be located adjacent to the camera module 980. For example, the first stopping structure 940 may be located between the camera module 980 and the support member 311. In another example, the first stopping structure 940 may be located between the camera module 980 and the screw 390.

In an embodiment, the first stopping structure 940 may include a first portion 9401 extending from the second plate 320 and a second portion 9402 curvedly extending from the first portion 9401 to face the first portion 9401. The first portion 9401 may extend from the second plate 320 in a direction (e.g., the −z direction) substantially perpendicular to the second plate 320. The second portion 9402 may include a first stopping protrusion 942 protruding toward the camera module 980 (or, a housing 982).

In an embodiment, the camera module 980 may include the housing 982 and a second stopping protrusion 984 formed on the housing 982. In an embodiment, the second stopping protrusion 984 may protrude from the housing 982 toward the first stopping structure 940 of the second plate 320. For example, the second stopping protrusion 984 may protrude from the housing 982 in the −y direction.

In an embodiment, the first stopping protrusion 942 and the second stopping protrusion 984 may be brought into contact with each other to prevent movement of the second plate 320. In an embodiment, the first stopping protrusion 942 may be located under the second stopping protrusion 984 (e.g., the −z direction). In an embodiment, the second stopping protrusion 984 may form at least two inclined surfaces. For example, the second stopping protrusion 984 may include a first inclined surface formed relatively above (e.g., the +z direction) and a second inclined surface formed relatively below (e.g., the −z direction). In an embodiment, the first stopping protrusion 942 of the first stopping structure 940 may be brought into contact with the second inclined surface of the second stopping protrusion 984. In an embodiment, the first stopping structure 940 may be formed to have an appropriate elastic force such that the first stopping protrusion 942 and the second inclined surface remain in contact with each other. In an embodiment, the first stopping structure 940 may remain in contact with the second stopping protrusion 984 by applying the elastic force toward the camera module 980.

In an embodiment, the second inclined surface may be formed to have a steeper slope than the first inclined surface such that when the first stopping protrusion 942 is fastened to the second stopping protrusion 984, the first stopping protrusion 942 may easily slide along the first inclined surface of the second stopping protrusion 984 and after the first stopping protrusion 942 is fastened to the second stopping protrusion 984, the first stopping protrusion 942 is not separated from the second inclined surface.

In an embodiment, the first stopping structure 940 seated on the second stopping protrusion 984 may prevent movement of the second plate 320 in a vertical direction (e.g., the z-axis direction).

In an embodiment, the screw 390 may be inserted into a third opening 992 formed in the support member 311 and may be fastened to the support member 311. In an embodiment, the second plate 320 may be coupled with the support member 311 through the screw 390. In an embodiment, a first intermediate member 950 may be disposed between the screw 390 and the second plate 320. In an embodiment, the first intermediate member 950 may have an annular shape having a hollow formed therein. In an embodiment, the screw 390 may pass through the hollow of the first intermediate member 950. In an embodiment, the first intermediate member 950 may prevent the second plate 320 from being deformed by an external force that acts depending on fastening the screw 390. In an embodiment, the first intermediate member 950 may include metal, such as stainless steel.

Figure 10:
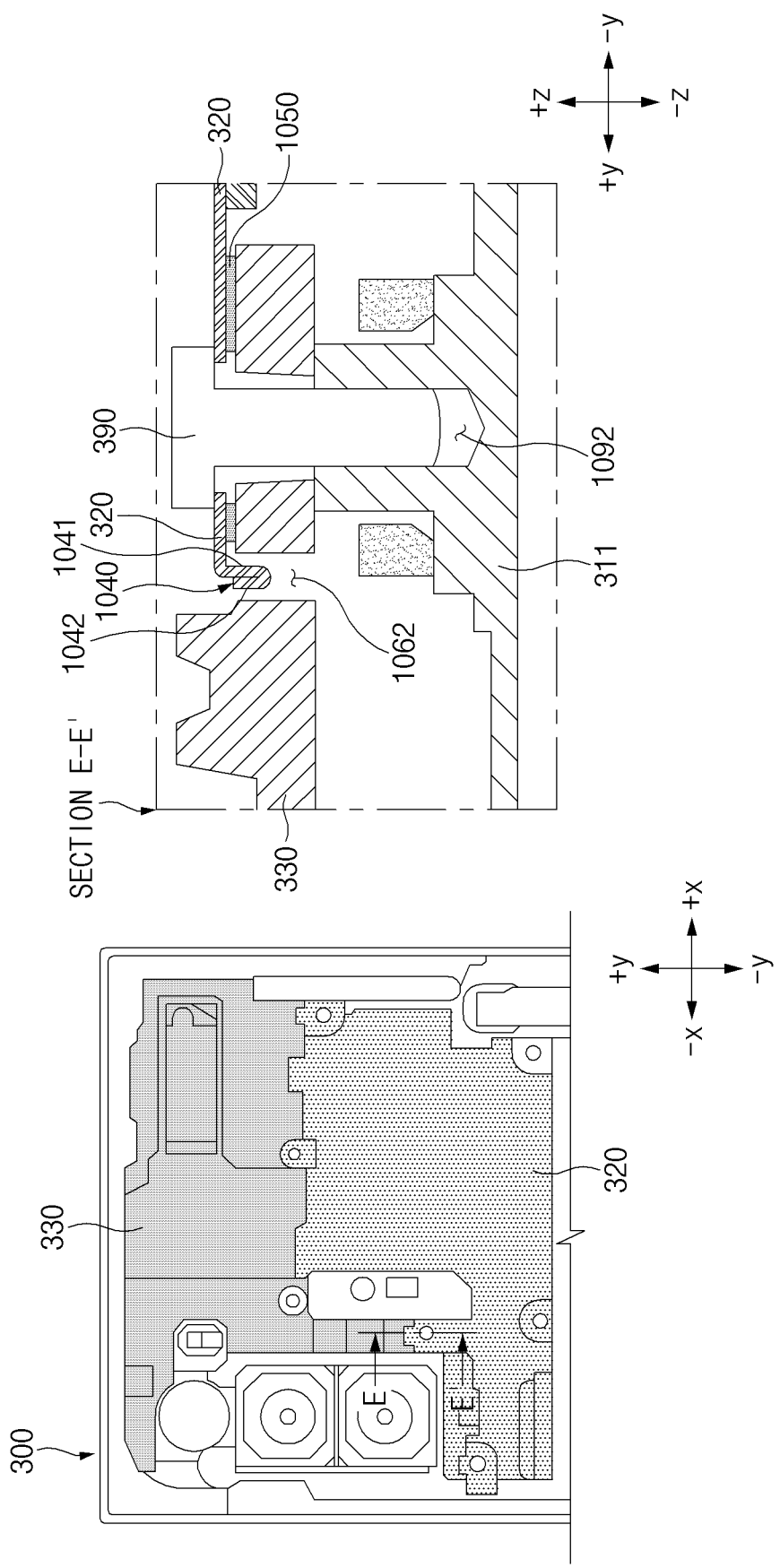
FIG. 10 illustrates a second stopping structure of an electronic device according to an embodiment of the disclosure.

FIG. 10 illustrates a second stopping structure of an electronic device according to an embodiment of the disclosure.

Referring to FIG. 10, the second plate 320 of the electronic device 300 according to an embodiment may include the second stopping structure 1040.

In an embodiment, the second stopping structure 1040 may be formed on the periphery of the second plate 320. For example, the second stopping structure 1040 may be formed on the periphery of the second plate 320 that overlaps the third plate 330 when the electronic device 300 is viewed from above (e.g., in the −z direction).

In an embodiment, to prevent movement of the second plate 320, the second stopping structure 1040 may be at least partially inserted into an opening 1062 formed in the third plate 330. For example, the second stopping structure 1040 may extend from the periphery of the second plate 320 toward the display (e.g., the display 101 of FIG. 1). For example, the second stopping structure 1040 may include a first portion 1041 extending from the second plate 320 in a direction substantially perpendicular to the second plate 320 and a second portion 1042 curvedly extending from the first portion 1041 to face the first portion 1041. For example, the first portion 1041 of the second stopping structure 1040 may extend in the −z direction, and the second portion 1042 may extend from the first portion 1041 in the +z direction. The first portion 1041 and the second portion 1042 may be in contact with each other.

In an embodiment, the second stopping structure 1040 inserted into the opening 1062 may prevent movement of the second plate 320 in a horizontal direction (e.g., the y-axis direction).

In an embodiment, the screw 390 may penetrate the second plate 320, a second intermediate member 1050, and the third plate 330 and may be inserted into a fourth opening 1092 formed in the support member 311. In an embodiment, as the screw 390 is fastened to the fourth opening 1092, the support member 311, the third plate 330, the second intermediate member 1050, and the second plate 320 may be coupled together.

In an embodiment, the description of the first intermediate member 950 of FIG. 9A may be correspondingly applied to the second intermediate member 1050.

Figure 11:
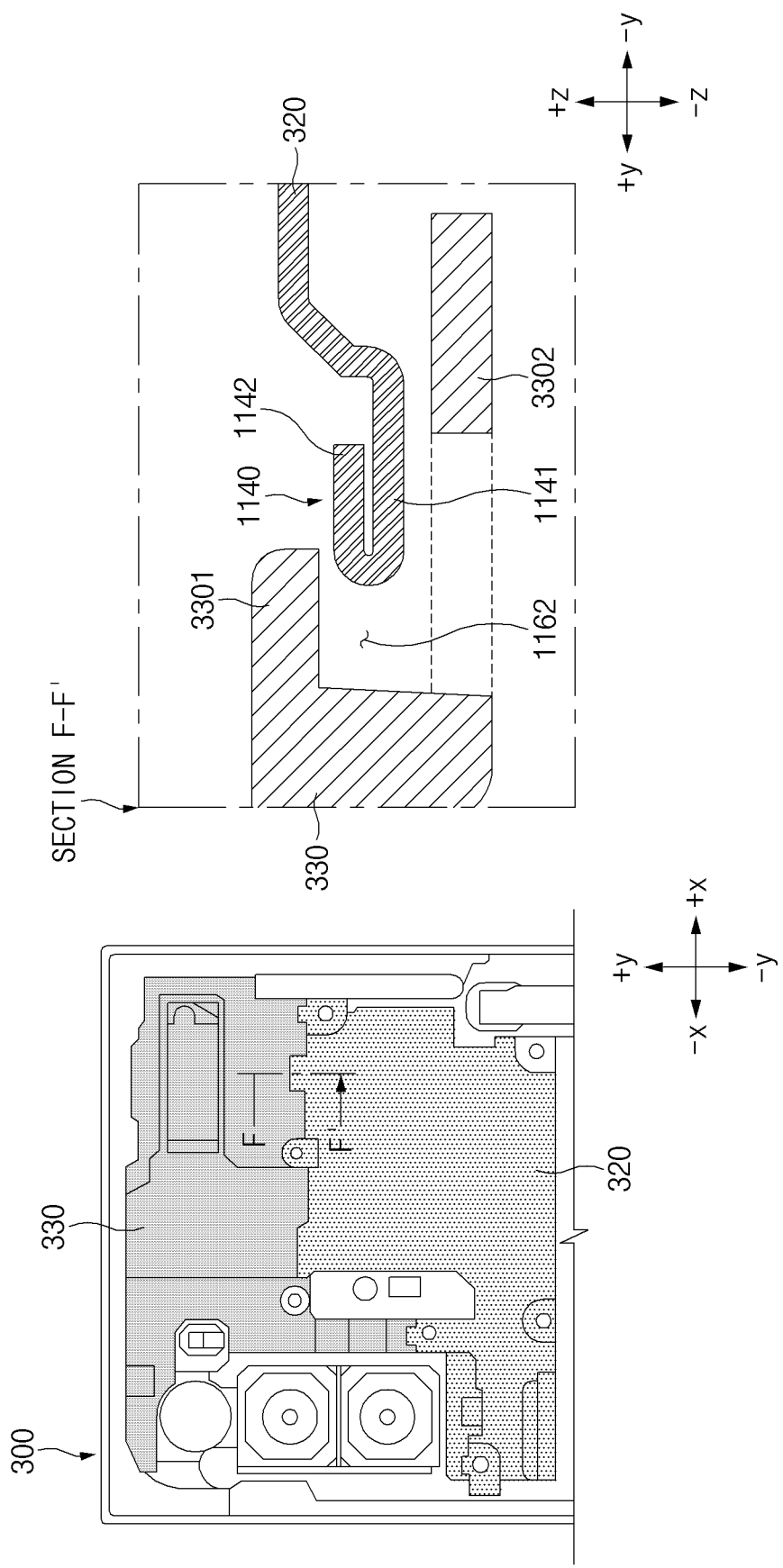
FIG. 11 illustrates a third stopping structure of an electronic device according to an embodiment of the disclosure.

FIG. 11 illustrates a third stopping structure of an electronic device according to an embodiment of the disclosure.

Referring to FIG. 11, the second plate 320 of the electronic device 300 according to an embodiment may include the third stopping structure 1140.

In an embodiment, the third stopping structure 1140 may be formed on the periphery of the second plate 320. In an embodiment, the third stopping structure 1140 may at least partially overlap the third plate 330 when the electronic device 300 is viewed from above (e.g., when viewed in the −z direction).

In an embodiment, the third stopping structure 1140 may include a first portion 1141 extending in a direction substantially parallel to the second plate 320 and a second portion 1142 extending from the first portion 1141 to face the first portion. For example, the first portion 1141 may extend in a direction (e.g., the +y direction) away from the second plate 320, and the second portion 1142 may extend from one end of the first portion 1141 in a direction (e.g., the −y direction) toward the second plate 320.

In an embodiment, to restrict movement of the second plate 320, the third stopping structure 1140 may be at least partially accommodated in a recess 1162 formed on the third plate 330. For example, a first portion 3301 of the third plate 330 may be located in the +z direction from the third stopping structure 1140 and may overlap the third stopping structure 1140. Movement of the third stopping structure 1140 in the +z direction may be restricted by the first portion 3301. For example, a second portion 3302 of the third plate 330 may be located in the −z direction from the third stopping structure 1140 and may overlap the third stopping structure 1140. Movement of the third stopping structure 1140 in the −z direction may be restricted by the second portion 3302.

In an embodiment, the third stopping structure 1140 may be disposed between the first portion 3301 and the second portion 3302 of the third plate 330 that form the recess 1162, and the third stopping structure 1140 accommodated in the recess 1162 may restrict movement of the second plate 320 in a vertical direction.

Figure 12A:
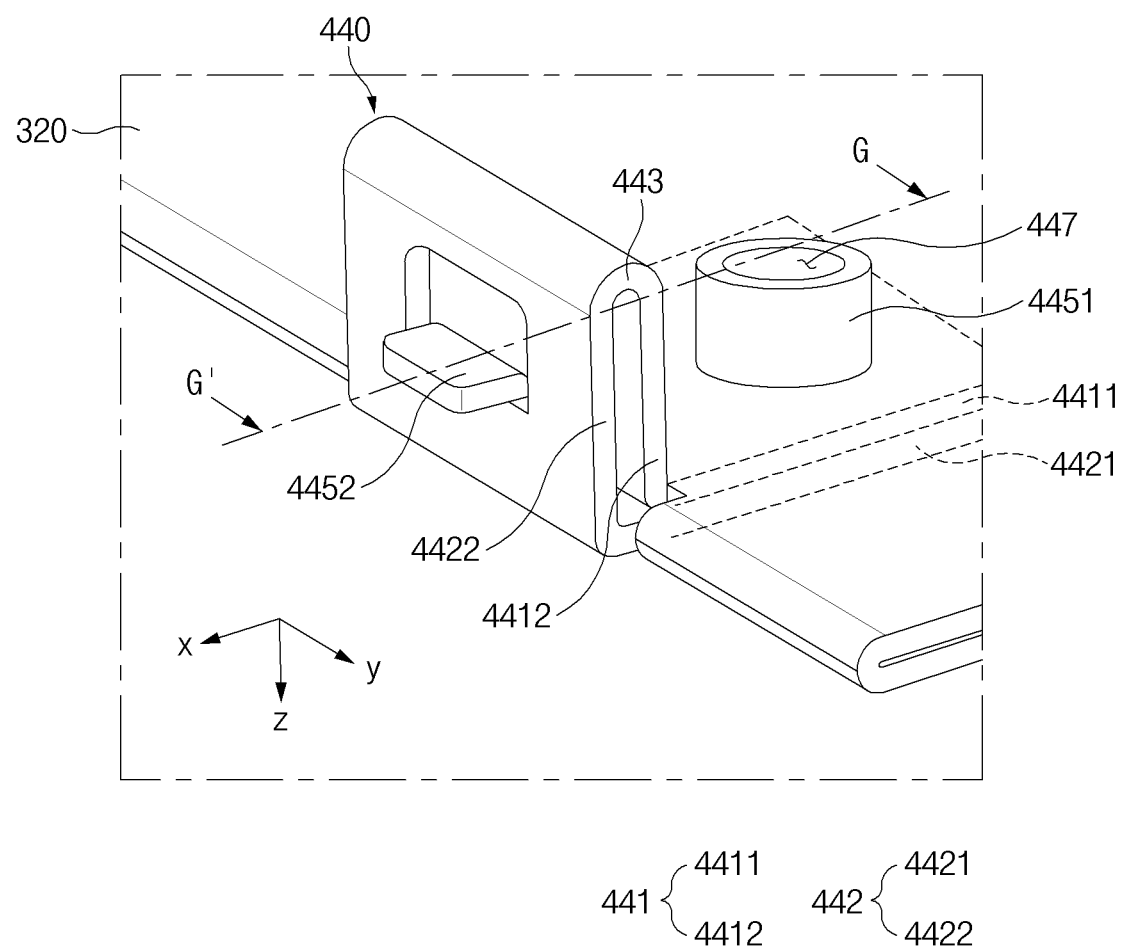
FIG. 12A illustrates a fourth stacked structure according to an embodiment of the disclosure.

FIG. 12A illustrates a fourth stacked structure according to an embodiment of the disclosure.

Figure 12B:
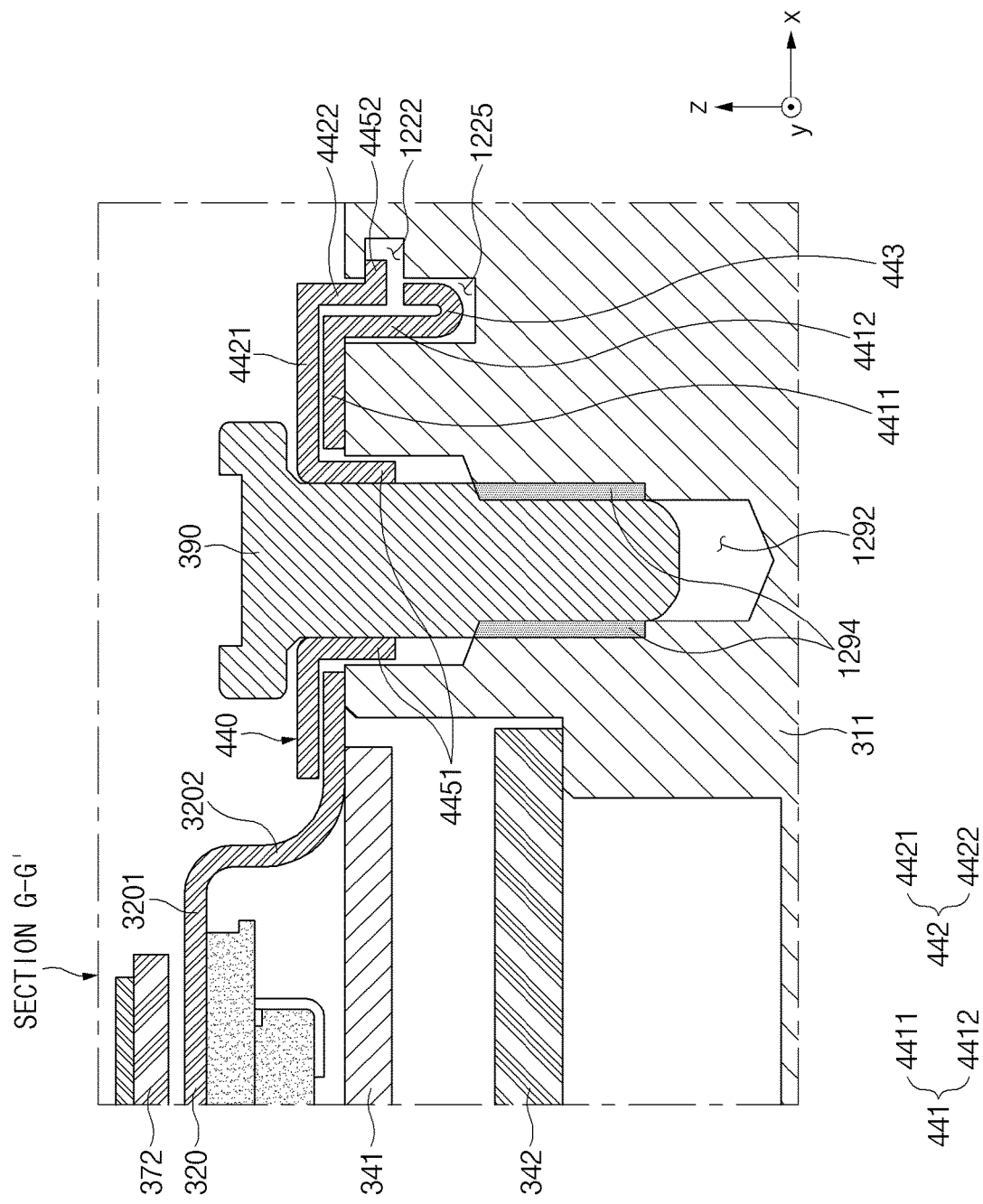
FIG. 12B is a sectional view taken along line G-G' of FIG. 12A according to an embodiment of the disclosure.

FIG. 12B is a sectional view taken along line G-G' of FIG. 12A according to an embodiment of the disclosure.

For convenience of description, not only the second plate 320 having the fourth stacked structure 440 formed thereon but also other components coupled with the second plate 320 are illustrated together in FIB. 12B.

Referring to FIGS. 12A and 12B, the second plate 320 according to an embodiment may include the fourth stacked structure 440 formed on the periphery of the second plate 320.

In an embodiment, the fourth stacked structure 440 may include a first layer 441, a second layer 442, a connecting portion 443, and a second protrusion 4452 formed on the second layer 442.

In an embodiment, the first layer 441, the second layer 442, the connecting portion 443, and the second protrusion 4452 of the fourth stacked structure 440 may correspond to the first layer 421, the second layer 422, the connecting portion 423, and the second protrusion 425 of the second stacked structure 420 of FIGS. 7A, 7B, and 7C, respectively.

In an embodiment, a first stopping recess 1222 and a second stopping recess 1225 formed in the support member 311 may correspond to the coupling portion 794, the first stopping recess 722, and the second stopping recess 725 of FIG. 7C.

In an embodiment, a third opening 1292 and a coupling portion 1294 formed in the support member 311 may correspond to the first opening 592 and the coupling portion 594 of FIG. 5C.

In an embodiment, unlike the second stacked structure 420 illustrated in FIG. 7A, the fourth stacked structure 440 may include a third protrusion 4451 formed on the second layer 442. In an embodiment, the third protrusion 4451 may correspond to the first protrusion 415 of FIG. 5C or the first protrusion 615 of FIG. 6A. For example, the third protrusion 4451 according to an embodiment may extend from a third portion 4421 of the second layer 442 toward the support member 311. In an embodiment, the third protrusion 4451 may penetrate the first layer 441 and may be at least partially inserted into the third opening 1292 formed in the support member 311. In an embodiment, the screw 390 may penetrate the third protrusion 4451. In an embodiment, the screw 390 may be inserted into an opening 447 formed in the third protrusion 4451 and a second opening 1291 and may be fastened to the coupling portion 1294.

In another embodiment, similarly to the first protrusion 615 of FIG. 6A, the third protrusion 4451 may extend from the first layer 441 rather than the second layer 442 toward the support member 311.

In an embodiment, the fourth stacked structure 440 may be understood as an embodiment in which the first stacked structure 410 and the second stacked structure 420 are coupled.

An electronic device according to an embodiment (e.g., the electronic device 100 of FIG. 1) may include a display (e.g., the display 101 of FIG. 1) that forms at least a portion of a front surface (e.g., the front surface 110A of FIG. 1) of the electronic device, a first plate (e.g., the first plate 111 of FIG. 2) that forms at least a portion of a rear surface (e.g., the rear surface 110B of FIG. 2) of the electronic device, a side member (e.g., the side member 310 of FIG. 3) that is disposed between the display and the first plate and that forms at least a portion of a side surface (e.g., the side surface 110C of FIG. 1) of the electronic device, a support member (e.g., the support member 311 of FIG. 3) that is disposed inside the side member and that has a first opening (e.g., the first opening 592 of FIG. 5C) and a first stopping recess (e.g., the first stopping recess 722 of FIG. 7C) formed therein, a printed circuit board (e.g., the at least one printed circuit board 340 of FIG. 3) disposed between the support member and the first plate, and a second plate (e.g., the second plate 320 of FIG. 4B) that is disposed between the first plate and the printed circuit board and coupled with the support member and that covers at least a portion of the printed circuit board. The second plate may include a stacked structure (e.g., at least one of the first stacked structure 410 of FIG. 5C, the first stacked structure 610 of FIG. 6A, the second stacked structure 420 of FIG. 7C, the third stacked structure 430 of FIG. 8, and/or the fourth stacked structure 440 of FIG. 12B) that is formed on a periphery of the second plate and that includes a first layer (e.g., at least one of the first layer 411 of FIG. 5C, the first layer 421 of FIG. 7C, the first layer 431 of FIG. 8, and/or the first layer 441 of FIG. 12B) that extends from the second plate and a second layer (e.g., at least one of the second layer 412 of FIG. 5C, the second layer 422 of FIG. 7C, the second layer 432 of FIG. 8, and/or the second layer 442 of FIG. 12B) disposed on the first layer. The stacked structure may include a first stacked structure (e.g., the first stacked structure 410 of FIG. 5C or the first stacked structure 610 of FIG. 6A) including a first protrusion (e.g., the first protrusion 415 of FIG. 5C or the first protrusion 615 of FIG. 6A) that extends toward the display and a second stacked structure (e.g., the second stacked structure 420 of FIG. 7C) including a second protrusion (e.g., the second protrusion 425 of FIG. 7C) that extends toward the side member. The first protrusion may be at least partially inserted into the first opening of the support member, and the second protrusion may be at least partially inserted into the first stopping recess of the support member.

In an embodiment, the first protrusion may extend from the second layer of the first stacked structure and may penetrate the first layer.

In an embodiment, the first protrusion may extend from the first layer of the first stacked structure.

In an embodiment, the first stacked structure may include a connecting portion (e.g., the connecting portion 413 of FIG. 5C) that extends from one end of the first layer to one end of the second layer.

The electronic device according to an embodiment may include a screw (e.g., the screw 390 of FIG. 5C) that penetrates the first protrusion and that is inserted into the first opening.

In an embodiment, the first layer of the second stacked structure may include a first portion (e.g., the first portion 4211 of FIG. 7C) that extends from the second plate and a second portion (e.g., the second portion 4212 of FIG. 7C) that extends from the first portion toward the display. The second layer of the second stacked structure may include a third portion (e.g., the third portion 4221 of FIG. 7C) disposed on the first portion and a fourth portion (e.g., the fourth portion 4222 of FIG. 7C) that extends from the third portion to face the second portion. The second stacked structure may include a connecting portion (e.g., the connecting portion 423 of FIG. 7C) that extends from one end of the second portion to one end of the fourth portion.

In an embodiment, the second protrusion may extend from the fourth portion toward the side member.

In an embodiment, a second stopping recess (e.g., the second stopping recess 725 of FIG. 7C) may be formed in the support member, and the connecting portion may be accommodated in the second stopping recess.

The electronic device according to an embodiment may include a screw (e.g., the screw 390 of FIG. 7C). A second opening (e.g., the second opening 792 of FIG. 7C) may be formed in the support member, and the screw may penetrate the first portion and the third portion of the second stacked structure and may be inserted into the second opening.

The electronic device according to an embodiment may include at least one connector (e.g., at least one of the first to seventh connectors C1 to C7 of FIG. 4B) disposed on the printed circuit board. The stacked structure may include a third stacked structure (e.g., the third stacked structure 430 of FIG. 8) that overlaps the at least one connector, and the third stacked structure may include a connecting portion (e.g., the connecting portion 433 of FIG. 8) that extends from one end of the first layer to one end of the second layer.

In an embodiment, the first layer of the third stacked structure may include a first surface (e.g., the first surface 431A of FIG. 8) that faces toward the first plate and a second surface (e.g., the second surface 431B of FIG. 8) that faces toward the display, and the second layer may be disposed on the first surface or the second surface.

In an embodiment, the electronic device may include a camera module (e.g., the camera module 980 of FIG. 9A) including a housing (e.g., the housing 982 of FIG. 9A). The second plate may include a first stopping structure (e.g., the first stopping structure 940 of FIG. 9A) formed on the periphery of the second plate. The first stopping structure may include a first stopping protrusion (e.g., the first stopping protrusion 942 of FIG. 9A) that protrudes toward the housing. The housing of the camera module may include a second stopping protrusion (e.g., the second stopping protrusion 984 of FIG. 9A) that protrudes toward the second plate and that is located over the first stopping protrusion. The first stopping protrusion and the second stopping protrusion may be brought into contact with each other to prevent movement of the second plate.

The electronic device according to an embodiment may include a third plate (e.g., the third plate 330 of FIG. 10) that is disposed between the first plate and the support member and that has an opening (e.g., the opening 1062 of FIG. 10) formed therein. The second plate includes a second stopping structure (e.g., the seconds stopping structure 1040 of FIG. 10) that extends from the periphery of the second plate toward the display, and the second stopping structure may be at least partially inserted into the opening to prevent movement of the second plate.

The electronic device according to an embodiment may include a third plate (e.g., the third plate 330 of FIG. 11) disposed between the first plate and the support member. The second plate may include a third stopping structure (e.g., the third stopping structure 1140 of FIG. 11) that extends from the periphery of the second plate in a direction substantially parallel to the second plate, and at least a portion of the third stopping structure may be accommodated in a recess (e.g., the recess 1162 of FIG. 11) formed on the third plate to prevent movement of the second plate.

The electronic device according to an embodiment may further include a loop antenna (e.g., the first antenna 372 of FIG. 3) disposed on the second plate.

In an embodiment, the second plate may include a clad metal.

An electronic device according to an embodiment (e.g., the electronic device 100 of FIG. 1) may include a display (e.g., the display 101 of FIG. 1) that forms at least a portion of a front surface (e.g., the front surface 110A of FIG. 1) of the electronic device, a first plate (e.g., the first plate 111 of FIG. 2) that forms at least a portion of a rear surface (e.g., the rear surface 110B of FIG. 2) of the electronic device, a side member (e.g., the side member 310 of FIG. 3) that is disposed between the display and the first plate and that forms at least a portion of a side surface (e.g., the side surface 110C of FIG. 1) of the electronic device, a support member (e.g., the support member 311 of FIG. 3) that is disposed inside the side member and that has a first opening (e.g., the first opening 592 of FIG. 5C) and a first stopping recess (e.g., the first stopping recess 722 of FIG. 7C) formed therein, a first printed circuit board (e.g., the first printed circuit board 341 of FIG. 3) disposed between the support member and the first plate, at least one connector (e.g., at least one of the first to seventh connectors C1 to C7 of FIG. 4B) disposed on the first printed circuit board, and a second plate (e.g., the second plate 320 of FIG. 4B) that is disposed between the first plate and the first printed circuit board and coupled with the support member and that covers at least a portion of the first printed circuit board. The second plate may include a stacked structure (e.g., at least one of the first stacked structure 410 of FIG. 5C, the first stacked structure 610 of FIG. 6A, the second stacked structure 420 of FIG. 7C, the third stacked structure 430 of FIG. 8, and/or the fourth stacked structure 440 of FIG. 12B) that is formed on a periphery of the second plate and that includes a first layer (e.g., at least one of the first layer 411 of FIG. 5C, the first layer 421 of FIG. 7C, the first layer 431 of FIG. 8, and/or the first layer 441 of FIG. 12B) that extends from the second plate and a second layer (e.g., at least one of the second layer 412 of FIG. 5C, the second layer 422 of FIG. 7C, the second layer 432 of FIG. 8, and/or the second layer 442 of FIG. 12B) disposed on the first layer. The stacked structure may include a first stacked structure (e.g., the first stacked structure 410 of FIG. 5C or the first stacked structure 610 of FIG. 6A) including a first protrusion (e.g., the first protrusion 415 of FIG. 5C or the first protrusion 615 of FIG. 6A) that extends toward the display, a second stacked structure (e.g., the second stacked structure 420 of FIG. 7C) including a second protrusion (e.g., the second protrusion 425 of FIG. 7C) that extends toward the side member, and a third stacked structure (e.g., the third stacked structure 430 of FIG. 8) that at least partially overlaps the at least one connector. The first protrusion may be at least partially inserted into the first opening of the support member to restrict movement of the second plate in a horizontal direction, and the second protrusion may be at least partially inserted into the first stopping recess of the support member to restrict movement of the second plate in a vertical direction.

The electronic device according to an embodiment may include a screw (e.g., the screw 390 of FIG. 5C). The first protrusion may extend from the second layer of the first stacked structure and may penetrate the first layer of the first stacked structure, and the screw may penetrate the first protrusion and may be inserted into the first opening.

In an embodiment, the first layer of the second stacked structure may include a first portion (e.g., the first portion 4211 of FIG. 7C) that extends from the second plate and a second portion (e.g., the second portion 4212 of FIG. 7C) that extends from the first portion toward the display. The second layer of the second stacked structure may include a third portion (e.g., the third portion 4221 of FIG. 7C) disposed on the first portion and a fourth portion (e.g., the fourth portion 4222 of FIG. 7C) that extends from the third portion to face the second portion. The second stacked structure may include a connecting portion (e.g., the connecting portion 423 of FIG. 7C) that extends from one end of the second portion to one end of the fourth portion.

In an embodiment, the third stacked structure may include a connecting portion (e.g., the connecting portion 433 of FIG. 8) of the third stacked structure that extends from one end of the first layer to one end of the second layer of the third stacked structure. The first layer of the third stacked structure may include a first surface (e.g., the first surface 431A of FIG. 8) that faces toward the first plate and a second surface (e.g., the second surface 431B of FIG. 8) that faces toward the display. The second layer of the third stacked structure may be disposed on the first surface or the second surface.

Figure 13:
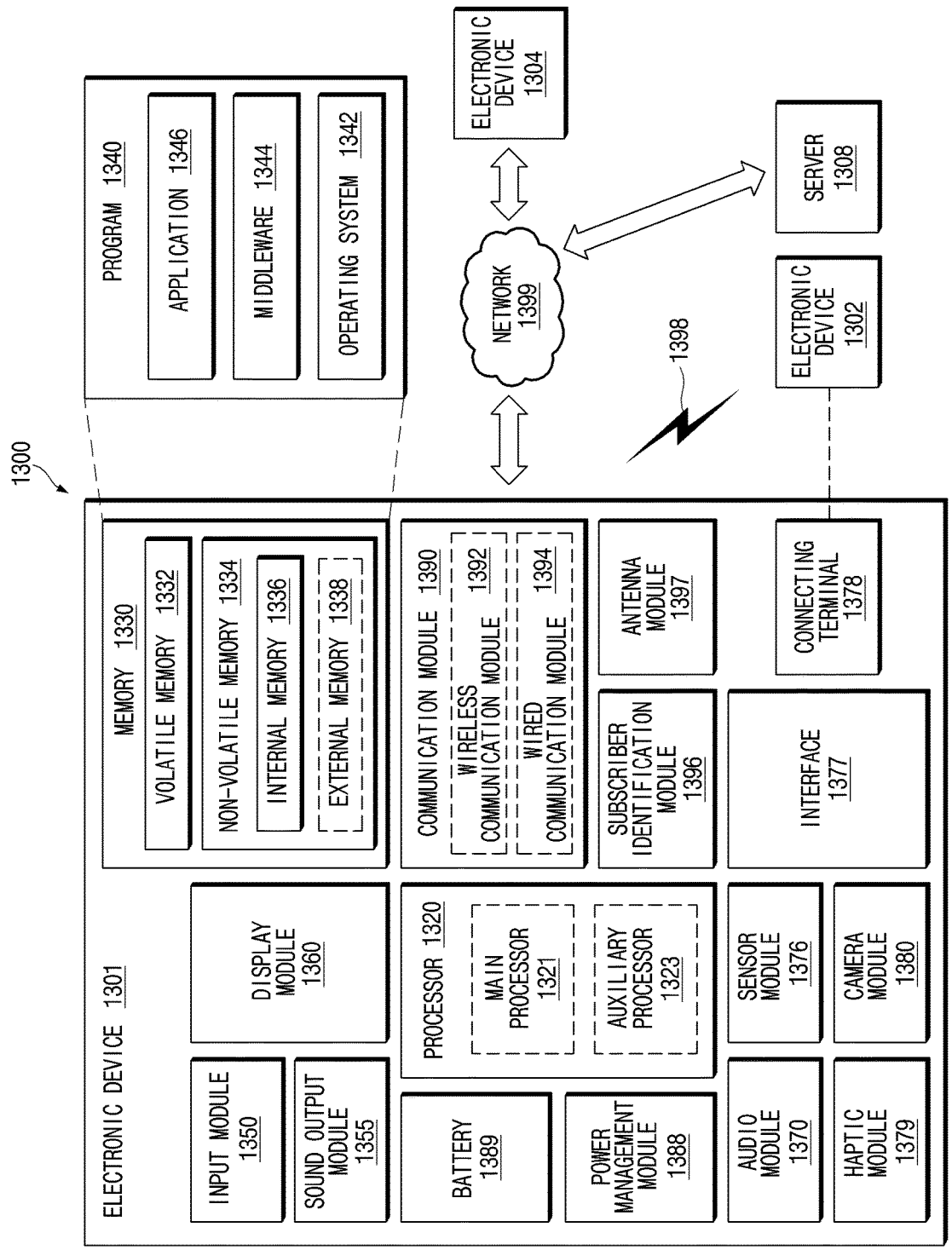
FIG. 13 is a block diagram of an electronic device in a network environment according to an embodiment of the disclosure.

FIG. 13 is a block diagram illustrating an electronic device in a network environment according to an embodiment of the disclosure.

Referring to FIG. 13, an electronic device 1301 in a network environment 1300 may communicate with an external electronic device 1302 via a first network 1398 (e.g., a short-range wireless communication network), or at least one of an external electronic device 1304 or a server 1308 via a second network 1399 (e.g., a long-range wireless communication network). According to an embodiment, the electronic device 1301 may communicate with the external electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in a non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., the external electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the external electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the external electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the external electronic device 1302, the external electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the external electronic device 1304), or a network system (e.g., the second network 1399). According to an embodiment, the wireless communication module 1392 may support a peak data rate (e.g., 20 Gbps or more) for implementing eMBB, loss coverage (e.g., 1364 dB or less) for implementing mMTC, or U-plane latency (e.g., 0.5 ms or less for each of downlink (DL) and uplink (UL), or a round trip of 13 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element including a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the external electronic devices 1302 or 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., an internal memory 1336 or an external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
  a display configured to form at least a portion of a front surface of the electronic device;
  a first plate configured to form at least a portion of a rear surface of the electronic device;
  a side member disposed between the display and the first plate and configured to form at least a portion of a side surface of the electronic device;
  a support member disposed inside the side member, the support member having a first opening and a first stopping recess formed therein;
  a printed circuit board disposed between the support member and the first plate; and
  a second plate disposed between the first plate and the printed circuit board and coupled with the support member, the second plate being configured to cover at least a portion of the printed circuit board,
  wherein the second plate includes a stacked structure formed on a periphery of the second plate, the stacked structure including a first layer configured to extend from the second plate and a second layer disposed on the first layer,
  wherein the stacked structure includes a first stacked structure including a first protrusion configured to extend toward the display and a second stacked structure including a second protrusion configured to extend toward the side member,
  wherein the first protrusion is at least partially inserted into the first opening of the support member, and
  wherein the second protrusion is at least partially inserted into the first stopping recess of the support member.

2. The electronic device of claim 1, wherein the first protrusion extends from the second layer of the first stacked structure and penetrates the first layer.

3. The electronic device of claim 1, wherein the first protrusion extends from the first layer of the first stacked structure.

4. The electronic device of claim 1, wherein the first stacked structure includes a connecting portion configured to extend from one end of the first layer to one end of the second layer.

5. The electronic device of claim 1, further comprising:
a screw configured to penetrate the first protrusion and inserted into the first opening.

6. The electronic device of claim 1, wherein the first layer of the second stacked structure includes:
a first portion configured to extend from the second plate; and
a second portion configured to extend from the first portion toward the display,
wherein the second layer of the second stacked structure includes:
a third portion disposed on the first portion, and
a fourth portion configured to extend from the third portion to face the second portion, and
wherein the second stacked structure includes a connecting portion configured to extend from one end of the second portion to one end of the fourth portion.

7. The electronic device of claim 6, wherein the second protrusion extends from the fourth portion toward the side member.

8. The electronic device of claim 6,
wherein a second stopping recess is formed in the support member, and
wherein the connecting portion is accommodated in the second stopping recess.

9. The electronic device of claim 6, further comprising:
a screw,
wherein a second opening is formed in the support member, and
wherein the screw penetrates the first portion and the third portion of the second stacked structure and is inserted into the second opening.

10. The electronic device of claim 1, further comprising:
at least one connector disposed on the printed circuit board,
wherein the stacked structure includes a third stacked structure configured to overlap the at least one connector, and
wherein the third stacked structure includes a connecting portion configured to extend from one end of the first layer to one end of the second layer.

11. The electronic device of claim 10,
wherein the first layer of the third stacked structure includes a first surface configured to face toward the first plate and a second surface configured to face toward the display, and
wherein the second layer is disposed on the first surface or the second surface.

12. The electronic device of claim 1, further comprising:
a camera module including a housing,
wherein the second plate includes a first stopping structure formed on the periphery of the second plate,
wherein the first stopping structure includes a first stopping protrusion configured to protrude toward the housing,
wherein the housing of the camera module includes a second stopping protrusion configured to protrude toward the second plate and located over the first stopping protrusion, and
wherein the first stopping protrusion and the second stopping protrusion are brought into contact with each other to prevent movement of the second plate.

13. The electronic device of claim 1, further comprising:
a third plate disposed between the first plate and the support member, the third plate having an opening formed therein,
wherein the second plate includes a second stopping structure configured to extend from the periphery of the second plate toward the display, and
wherein the second stopping structure is at least partially inserted into the opening to prevent movement of the second plate.

14. The electronic device of claim 1, further comprising:
a third plate disposed between the first plate and the support member,
wherein the second plate includes a third stopping structure configured to extend from the periphery of the second plate in a direction substantially parallel to the second plate, and
wherein at least a portion of the third stopping structure is accommodated in a recess formed on the third plate to prevent movement of the second plate.

15. The electronic device of claim 1, further comprising:
a loop antenna disposed on the second plate.

16. The electronic device of claim 1, wherein the second plate includes a clad metal.

17. An electronic device comprising:
a display forming at least a portion of a front surface of the electronic device;
a first plate forming at least a portion of a rear surface of the electronic device;
a side member disposed between the display and the first plate, wherein the side member forms at least a portion of a side surface of the electronic device;
a support member disposed inside the side member, wherein a first opening and a first stopping recess are formed in the support member;
a first printed circuit board disposed between the support member and the first plate;
at least one connector disposed on the first printed circuit board; and
a second plate disposed between the first plate and the first printed circuit board and coupled with the support member, and that covers at least a portion of the first printed circuit board,
wherein the second plate includes a stacked structure that is formed on a periphery of the second plate and that includes a first layer extending from the second plate and a second layer disposed on the first layer,
wherein the stacked structure includes:
a first stacked structure including a first protrusion that extends toward the display,
a second stacked structure including a second protrusion that extends toward the side member, and
a third stacked structure that at least partially overlaps the at least one connector,
wherein the first protrusion is at least partially inserted into the first opening of the support member to restrict movement of the second plate in a horizontal direction, and
wherein the second protrusion is at least partially inserted into the first stopping recess of the support member to restrict movement of the second plate in a vertical direction.

18. The electronic device of claim 17, further comprising a screw,
wherein the first protrusion extends from the second layer of the first stacked structure and penetrates the first layer of the first stacked structure, and wherein the screw penetrates the first protrusion and is inserted into the first opening.

19. The electronic device of claim 18, wherein the first layer of the second stacked structure includes:
- a first portion that extends from the second plate; and
- a second portion that extends from the first portion toward the display, wherein the second layer of the second stacked structure includes:
- a third portion disposed on the first portion, and
- a fourth portion that extends from the third portion to face the second portion, and wherein the second stacked structure includes a connecting portion that extends from one end of the second portion to one end of the fourth portion.

20. The electronic device of claim 19, wherein the third stacked structure includes a connecting portion of the third stacked structure that extends from one end of the first layer to one end of the second layer of the third stacked structure, wherein the first layer of the third stacked structure includes a first surface that faces toward the first plate and a second surface that faces toward the display, and wherein the second layer of the third stacked structure is disposed on the first surface or the second surface.

* * * * *